(12) United States Patent
Salter et al.

(10) Patent No.: US 12,097,794 B2
(45) Date of Patent: Sep. 24, 2024

(54) LOAD RAMP FOR A VEHICLE

(71) Applicant: Ford Global Technologies, LLC, Dearborn, MI (US)

(72) Inventors: Stuart C. Salter, White Lake, MI (US); David Brian Glickman, Southfield, MI (US); Peter Phung, Windsor (CA); Paul Kenneth Dellock, Northville, MI (US); Pietro Buttolo, Dearborn Heights, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 285 days.

(21) Appl. No.: 17/198,996

(22) Filed: Mar. 11, 2021

(65) Prior Publication Data
US 2022/0289093 A1 Sep. 15, 2022

(51) Int. Cl.
*B60P 1/43* (2006.01)
*B32B 3/12* (2006.01)
(Continued)

(52) U.S. Cl.
CPC ............ *B60P 1/433* (2013.01); *B32B 3/12* (2013.01); *B32B 5/02* (2013.01); *B32B 37/0076* (2013.01); *B32B 37/06* (2013.01); *B32B 37/10* (2013.01); *B32B 37/146* (2013.01); *B32B 38/08* (2013.01); *B32B 2037/1253* (2013.01); *B32B 2037/243* (2013.01); *B32B 2038/0076* (2013.01); *B32B 2260/021* (2013.01); *B32B 2260/04* (2013.01); *B32B 2317/18* (2013.01); *B32B 2375/00* (2013.01); *B32B 2605/00* (2013.01)

(58) Field of Classification Search
None
See application file for complete search history.

(56) References Cited

U.S. PATENT DOCUMENTS 5,735,986 A * 4/1998 Fell ..................... B29C 66/1312
156/197
6,378,927 B1 4/2002 Parry-Jones et al.
(Continued)

FOREIGN PATENT DOCUMENTS

CA 2625424 A1 * 9/2009 ........... B29C 70/443
KR 20170044943 A * 4/2017
(Continued)

OTHER PUBLICATIONS

KR20170044943A_machine_translation (Year: 2017).*
WO2009098006A1_machine_translation (Year: 2009).*

*Primary Examiner* — Michael N Orlando
*Assistant Examiner* — Abhishek A Patwardhan
(74) *Attorney, Agent, or Firm* — Vichit Chea; Price Heneveld LLP

(57) ABSTRACT

A load ramp for a vehicle includes a corrugated layer that has a first surface and a second surface. A first layer is positioned adjacent to the first surface of the corrugated layer. A second layer is positioned adjacent to the second surface of the corrugated layer such that the corrugated layer is positioned between the first and second layers. A thickness of the load ramp can be in the range of about 10 mm to about 30 mm. A load capacity of the load ramp can be at least about 100 kg. A method of manufacturing the load ramp is also disclosed.

18 Claims, 21 Drawing Sheets

(51) Int. Cl.
*B32B 5/02* (2006.01)
*B32B 37/00* (2006.01)
*B32B 37/06* (2006.01)
*B32B 37/10* (2006.01)
*B32B 37/12* (2006.01)
*B32B 37/14* (2006.01)
*B32B 37/24* (2006.01)
*B32B 38/00* (2006.01)
*B32B 38/08* (2006.01)

(56) References Cited

U.S. PATENT DOCUMENTS

| | | | |
|---|---|---|---|
| 6,776,865 B1 * | 8/2004 | Yamaguchi | B32B 27/38 428/116 |
| 6,802,095 B1 * | 10/2004 | Whitmarsh | B60P 1/433 14/71.3 |
| 7,488,021 B1 | 2/2009 | Roos et al. | |
| 8,174,146 B2 | 5/2012 | Cheal et al. | |
| 8,511,734 B2 | 8/2013 | Hutchins, Jr. et al. | |
| 8,838,333 B2 | 9/2014 | Cheal et al. | |
| 9,097,055 B2 | 8/2015 | Cheal et al. | |
| 9,308,802 B2 | 4/2016 | Warburton et al. | |
| 9,636,978 B2 | 5/2017 | Warburton et al. | |
| 9,676,258 B2 | 6/2017 | Warburton et al. | |
| 9,902,306 B1 | 2/2018 | Foss et al. | |
| 9,909,347 B2 | 3/2018 | Warburton et al. | |
| 10,668,848 B2 | 6/2020 | DeSimone | |
| 2021/0129641 A1 * | 5/2021 | Hawkins | B60J 7/1607 |

FOREIGN PATENT DOCUMENTS

| | | | | |
|---|---|---|---|---|
| WO | WO-2009098006 A1 * | 8/2009 | | B29C 70/086 |
| WO | WO-2012059713 A1 * | 5/2012 | | B32B 3/12 |

* cited by examiner

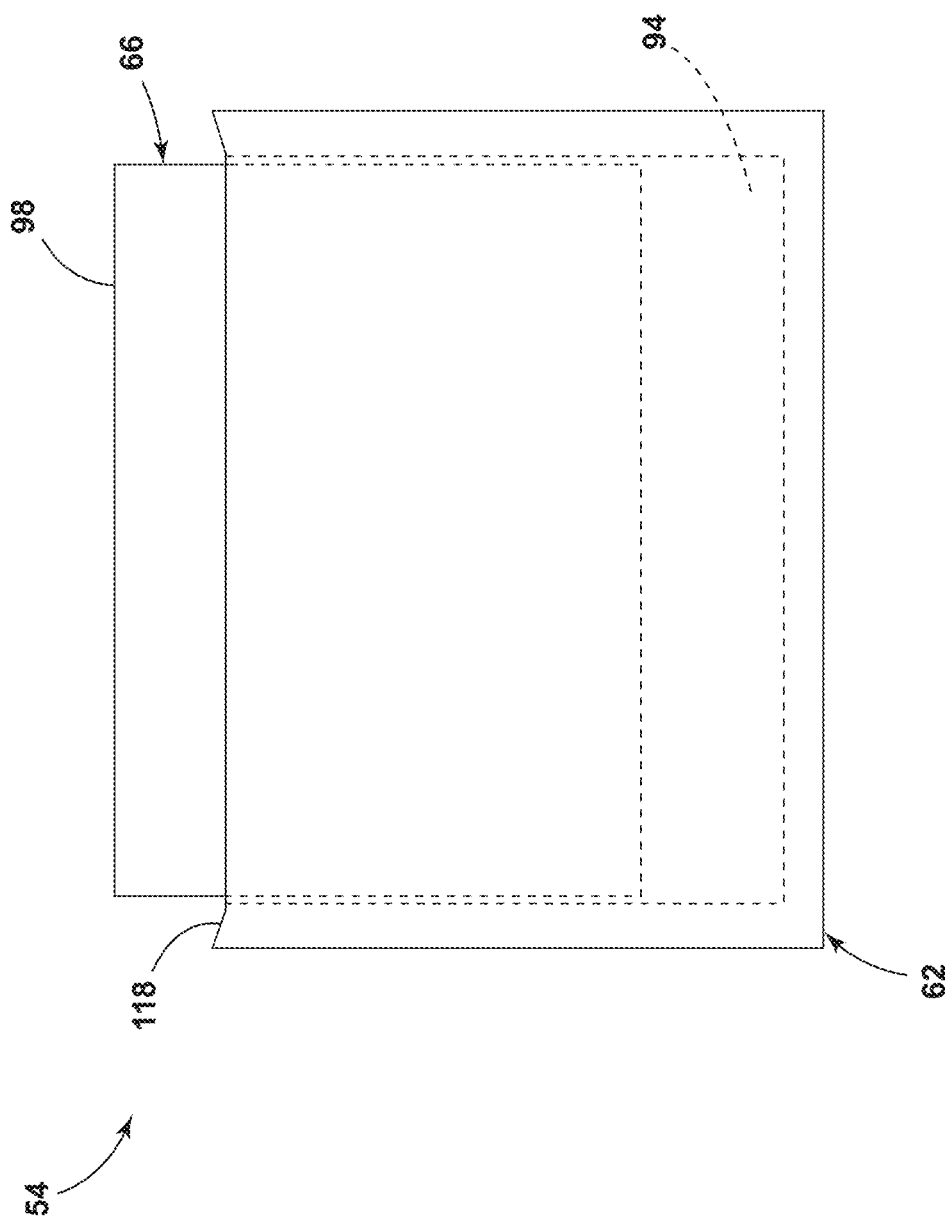

LOAD RAMP FOR A VEHICLE

FIELD OF THE DISCLOSURE

The present disclosure generally relates to load ramps. More specifically, the present disclosure relates to load ramps for vehicles.

BACKGROUND OF THE INVENTION

Consumers often compare available features and functionality between vehicles when making a purchasing decision. Accordingly, additional solutions are needed that provide features and functionality that are desirable to consumers.

SUMMARY OF THE INVENTION

According to a first aspect of the present invention, a method of manufacturing a load ramp for a vehicle includes positioning a corrugated layer between a first layer and a second layer such that the corrugated layer is in contact with a first interior surface of the first layer and a second interior surface of the second layer. The method also includes applying a resin to a first exterior surface of the first layer. An amount of the resin applied to the first exterior surface can be sufficient to permeate the first layer and contact the corrugated layer. The method further includes applying the resin to a second exterior surface of the second layer. An amount of the resin applied to the second exterior surface can be sufficient to permeate the second layer and contact the corrugated layer. Additionally, the method includes curing the resin to form the load ramp for the vehicle.

Embodiments of the first aspect of the invention can include any one or a combination of the following features:
- the step of curing the resin to form the load ramp for the vehicle includes heating the first layer, the corrugated layer, and the second layer to a temperature in the range of about 150° C. to about 180° C.;
- the temperature that the first layer, the corrugated layer, and the second layer are heated to is in the range of about 150° C. to about 160° C.;
- the step of curing the resin to form the load ramp for the vehicle includes exposing the first layer, the corrugated layer, and the second layer to a pressure in the range of about 100 tons to about 400 tons;
- the pressure that the first layer, the corrugated layer, and the second layer are exposed to is in the range of about 250 tons to about 350 tons;
- the corrugated layer defines a honeycomb structure;
- the honeycomb structure includes a first sheet and a second sheet, wherein the first and second sheets are adjacent to one another and each include ridges and valleys;
- a thickness of the first sheet and a thickness of the second sheet are each in the range of about 0.5 mm to about 2.0 mm;
- the ridges of the first sheet contact the valleys of the second sheet in an alternating fashion such that a series of cells are defined by the first sheet and the second sheet;
- a length of each cell in the series of cells is in the range of about 10 mm to about 20 mm;
- a width of each cell in the series of cells is in the range of about 5 mm to about 15 mm;
- a thickness of the corrugated layer is in the range of about 5 mm to about 15 mm;
- a thickness of the load ramp is in the range of about 10 mm to about 30 mm;
- a load capacity of the load ramp is at least about 100 kg;
- the corrugated layer is a processed cellulose fiber; and
- the resin is polyurethane.

According to a second aspect of the present disclosure, a load ramp for a vehicle includes a corrugated layer that has a first surface and a second surface. A first layer is positioned adjacent to the first surface of the corrugated layer. A second layer is positioned adjacent to the second surface of the corrugated layer such that the corrugated layer is positioned between the first and second layers. A thickness of the load ramp can be in the range of about 10 mm to about 30 mm. A load capacity of the load ramp can be at least about 100 kg.

Embodiments of the second aspect of the present disclosure can include any one or a combination of the following features:
- the corrugated layer includes a first sheet and a second sheet that extend between the first surface and the second surface of the corrugated layer, wherein the first sheet and the second sheet are adjacent to one another and each include ridges and valleys;
- the ridges of the first sheet contact the valleys of the second sheet in an alternating fashion such that a series of cells are defined by the first sheet and the second sheet; and
- a length of each cell in the series of cells is in the range of about 10 mm to about 20 mm, wherein a width of each cell in the series of cells is in the range of about 5 mm to about 15 mm, wherein a thickness of the corrugated layer is in the range of about 5 mm to about 15 mm, and wherein a thickness of the first sheet and a thickness of the second sheet are each in the range of about 0.5 mm to about 2.0 mm.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 9 is a top schematic view of the interaction between the lower closure panel and the load ramp, according to another example;

DETAILED DESCRIPTION OF THE PREFERRED EMBODIMENTS

Figure 1:
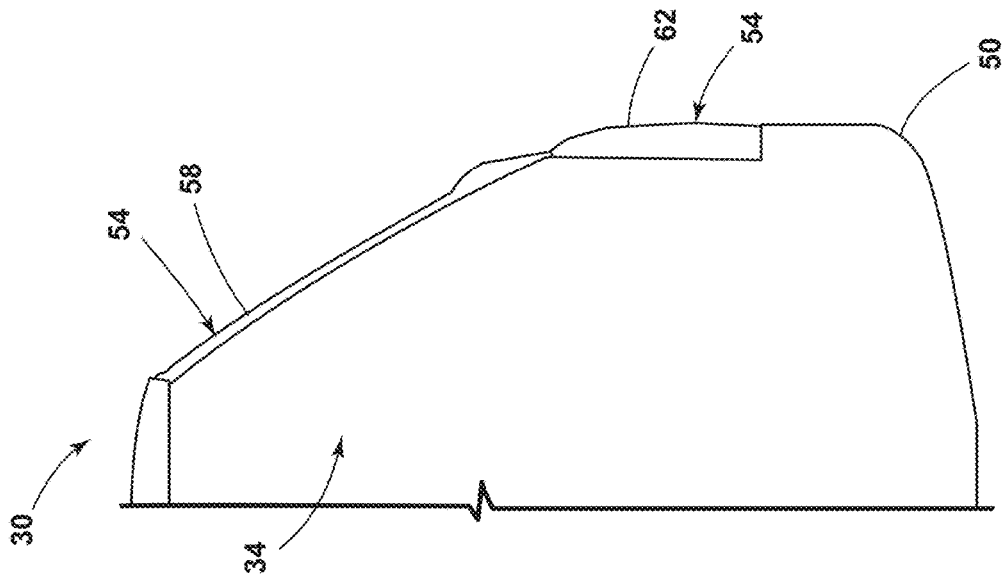
FIG. 1 is a side view of a rear of a vehicle, illustrating an upper closure panel and a lower closure panel each in a closed position, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a load ramp for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-22, reference numeral 30 generally designates a vehicle. The vehicle 30 includes a body 34 that defines an access aperture 38. In various examples, the access aperture 38 can provide access to a passenger compartment 42 and/or a cargo area 46 of the vehicle 30. For example, the access aperture 38 may be located at a rear 50 of the vehicle 30. The access aperture 38 can be selectively covered by one or more closure panels 54. For example, an upper closure panel 58 and/or a lower closure panel 62 may be employed. The upper closure panel 58, when employed, is operable between a closed position (see FIG. 1) and an open position (see FIG. 2). Similarly, the lower closure panel 62, when employed, is operable between a closed position (see FIG. 1) and an open position (see FIG. 2), The lower closure panel 62 can be provided with a load ramp 66 and/or the lower closure 62 can be configured to receive the load ramp 66. The load ramp 66 can include a corrugated layer 70 that has a first surface 74 and a second surface 78. A first layer 82 can be positioned adjacent to the first surface 74 of the corrugated layer 70. A second layer 86 can be positioned adjacent to the second surface 78 of the corrugated layer 70 such that the corrugated layer 70 is positioned between the first and second layers 82, 86. A thickness 90 of the load ramp 66 can be in the range of about 10 mm to about 30 mm. For example, the thickness 90 of the load ramp 66 can be about 10 mm, about 15 mm, about 20 mm, about 25 mm, about 30 mm, and/or combinations or ranges thereof. A load capacity of the load ramp 66 being at least about 100 kg. For example, the load capacity of the load ramp 66 may be at least about 100 kg, at least about 110 kg, at least about 120 kg, at least about 130 kg, at least about 140 kg, at least about 150 kg, and/or combinations or ranges thereof.

Referring again to FIGS. 1-2, the vehicle 30 may be an animal-drawn (e.g., horse-drawn) vehicle, various types of equipment (e.g., farm equipment), and/or a motor vehicle. For example, the vehicle 30 may be a land-based vehicle (e.g., an automobile, a motorcycle, a train, a horse-drawn carriage, a tractor, etc.), an air-based vehicle (e.g., an airplane, a helicopter, etc.), and/or a water-based vehicle (e.g., a boat or other watercraft). While the vehicle 30 may be a motor vehicle, the present disclosure is not limited to internal combustion engines as a source of locomotive power for the vehicle 30. Rather, alternative sources may be utilized in providing locomotive power to the vehicle 30. For example, locomotive power may be provided to the vehicle 30 by electric motors, fuel cells, and/or petroleum-based fuel engines. According to various examples, the vehicle 30 may be driver-controlled, semi-autonomous, fully-autonomous, or any combination of user-controlled and automated. For example, the semi-autonomous example of the vehicle 30 may perform many or all-commuting functions (e.g., accelerating, braking, turning, signaling, etc.) independent of user interaction while the user maintains override control of the vehicle 30. It is contemplated that animal-drawn (e.g., horse-drawn) vehicles and/or various types of equipment (e.g., farm equipment) may benefit from the concepts disclosed herein.

Figure 2:
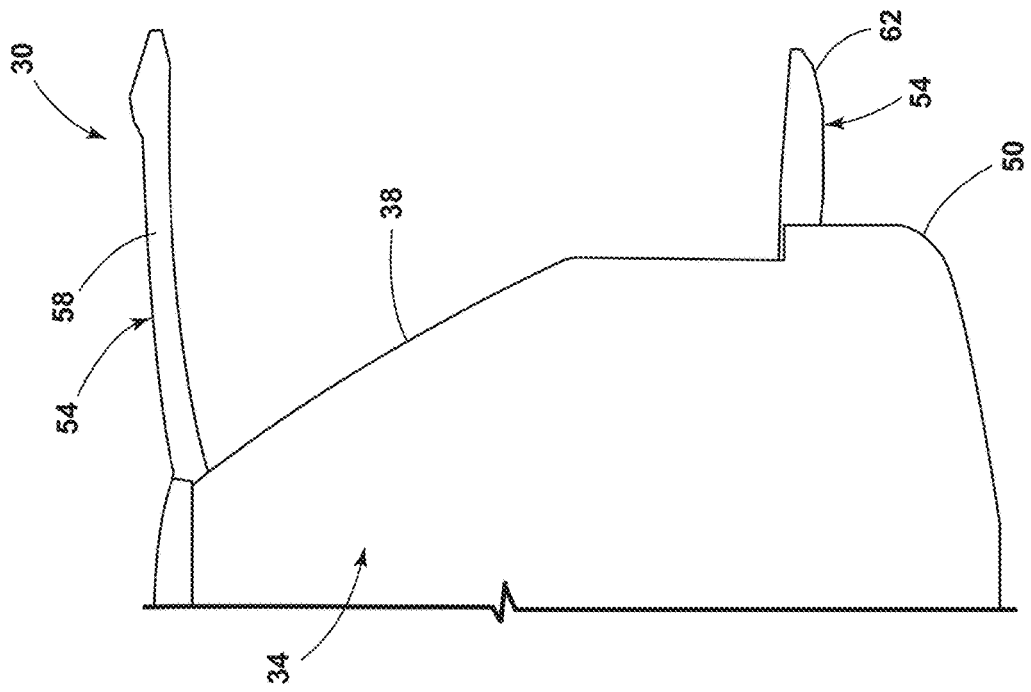
FIG. 2 is a side view of the rear of the vehicle, illustrating the upper closure panel and the lower closure panel each in an open position, according to one example.

Referring further to FIGS. 1-2, the upper closure panel 58 and the lower closure panel 62 can each cover at least a portion of the access aperture 38 when in the closed position. In some examples, when the upper and lower closure panels 58, 62 are both in the closed position, an entirety of the access aperture 38 of the vehicle 30 can be covered. For example, the upper and lower closure panels 58, 62 may each cover about 50% of the access aperture 38 such that the entirety of the access aperture 38 is covered when the upper and lower closure panels 58, 62 are each in the closed position. Accordingly, in such an example, the lower closure panel 62 may cover the lower half of the access aperture 38 while the upper closure panel 58 covers an upper half of the access aperture 38. However, the present disclosure is not so limited. Rather, the upper and lower closure panels 58, 62 may be sized and/or dimensioned in any manner that provides a covering of the entirety of the access aperture 38. For example, expressing the coverage of the upper and lower closure panels 58, 62 of the access aperture 38 as a ratio of upper closure panel 58 coverage to lower closure panel 62 coverage (upper closure panel coverage: lower closure panel coverage), the upper closure panel 58 and the lower closure panel 62 may have a ratio split of the access aperture 38 of about 95:5, about 90:10, about 85:15, about 80:20, about 75:25, about 70:30, about 65:35, about 60:40, about 55:45, about 50:50, about 45:55, about 40:60, about 35:65, about 30:70, and so on without departing from the concepts disclosed herein. In some examples, the lower closure panel 62 may be sized and/or dimensioned to independently cover an entirety of the access aperture 38 to the exclusion of the upper closure panel 58 (e.g., for a bed of a pickup truck).

Figure 3:
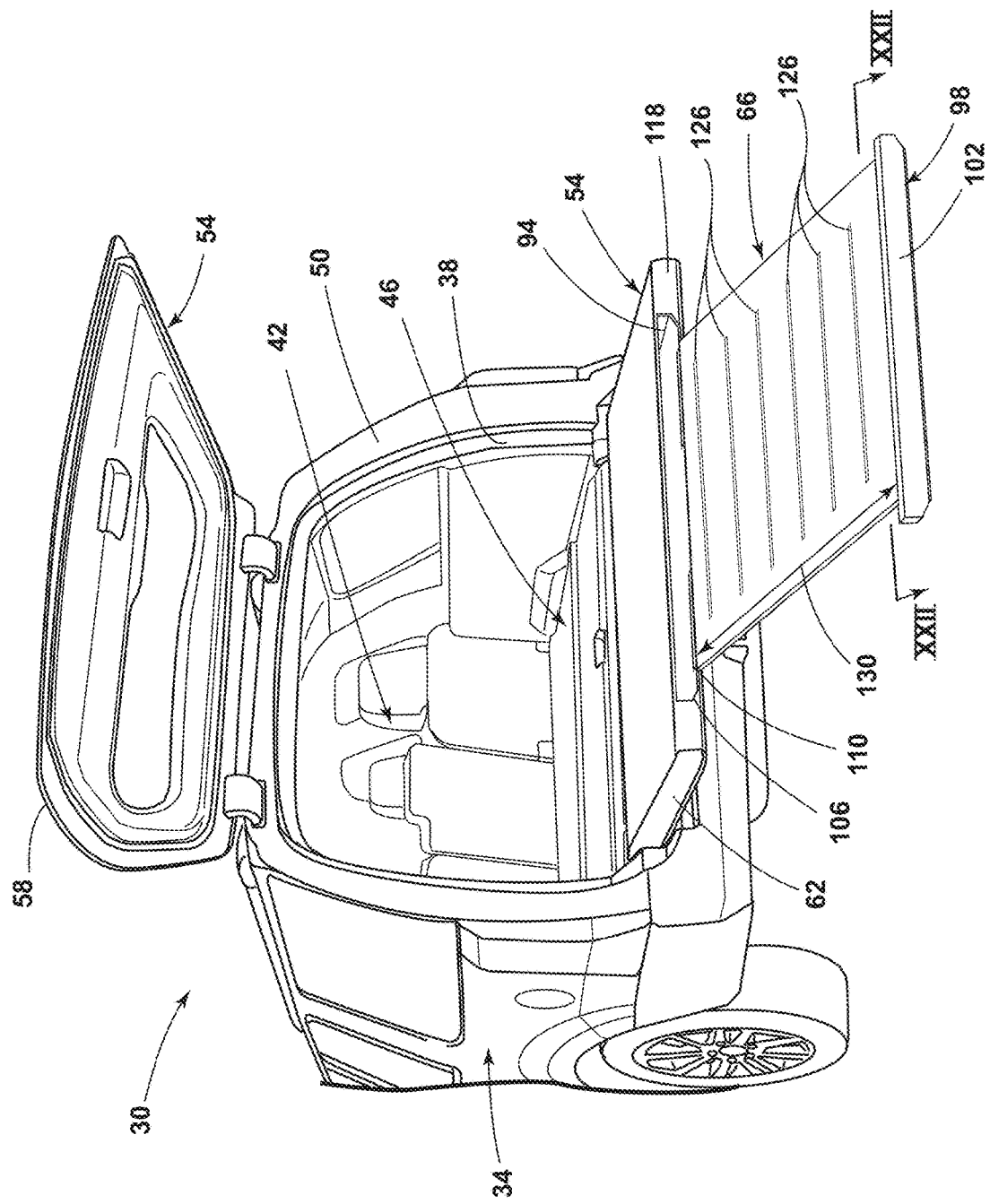
FIG. 3 is a rear perspective view of the vehicle, illustrating a load ramp in an extended position, according to one example.
Figure 4:
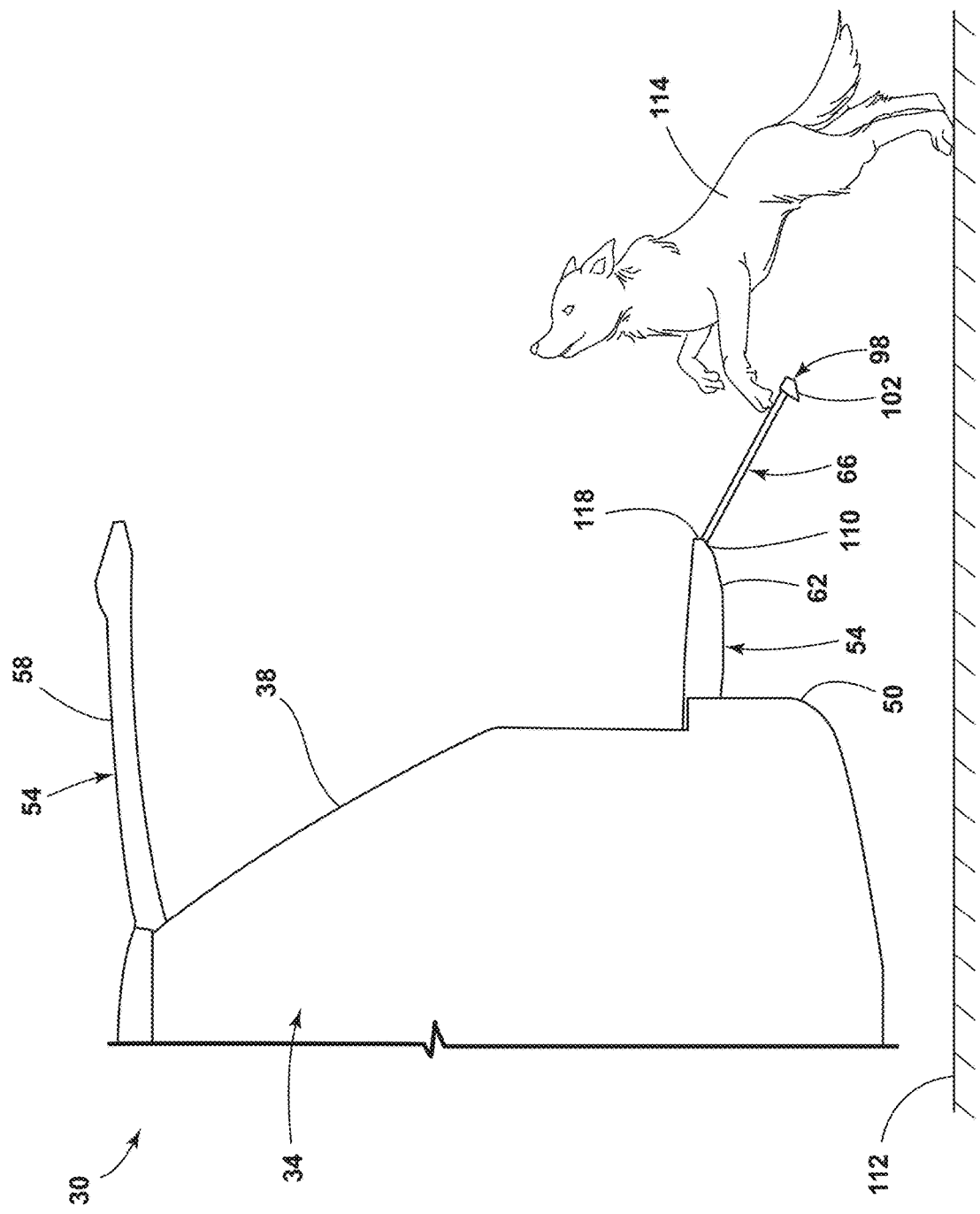
FIG. 4 is a side view of the rear of the vehicle, illustrating a pet utilizing the extended load ramp, according to one example.
Figure 5:
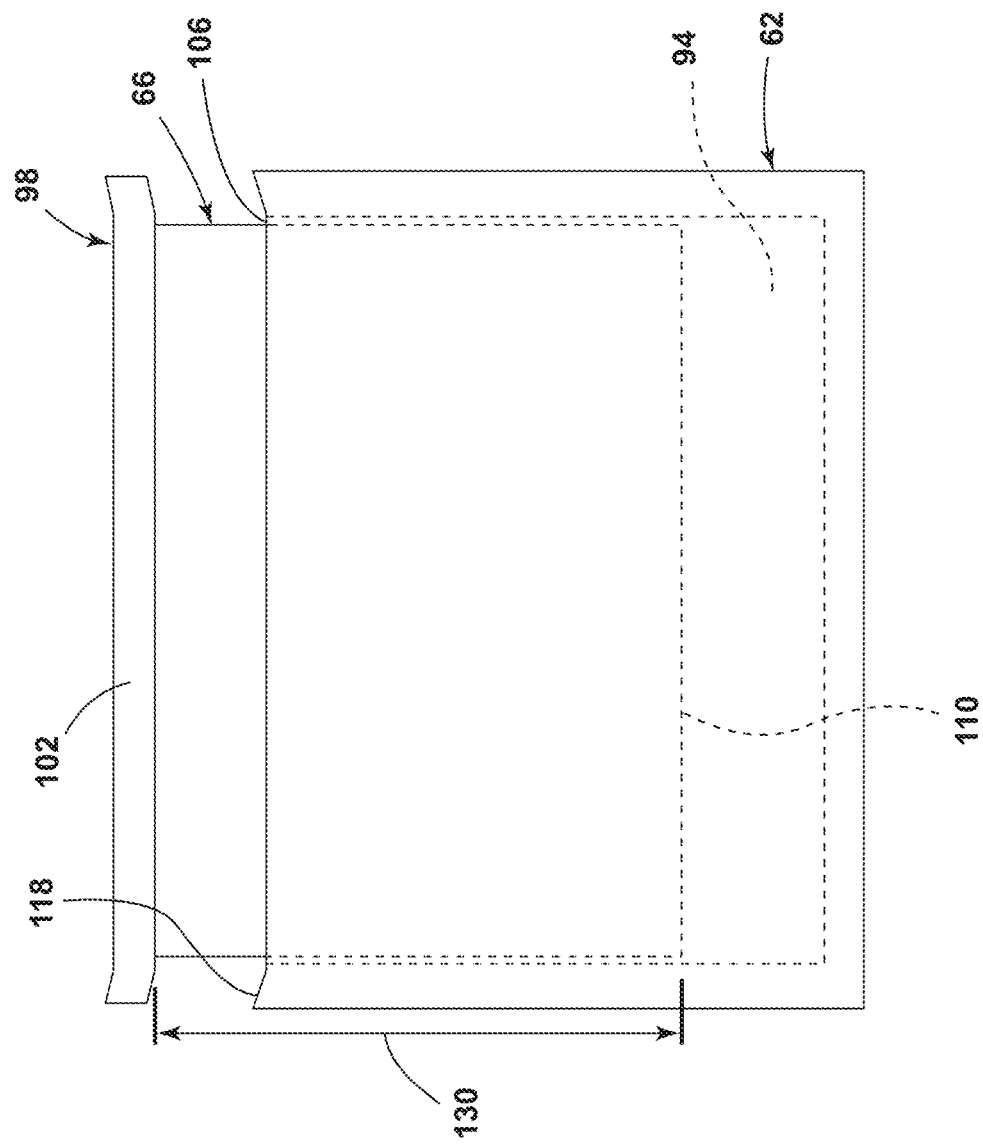
FIG. 5 is a top schematic view of an interaction between the lower closure panel and the load ramp, according to one example.
Figure 6:
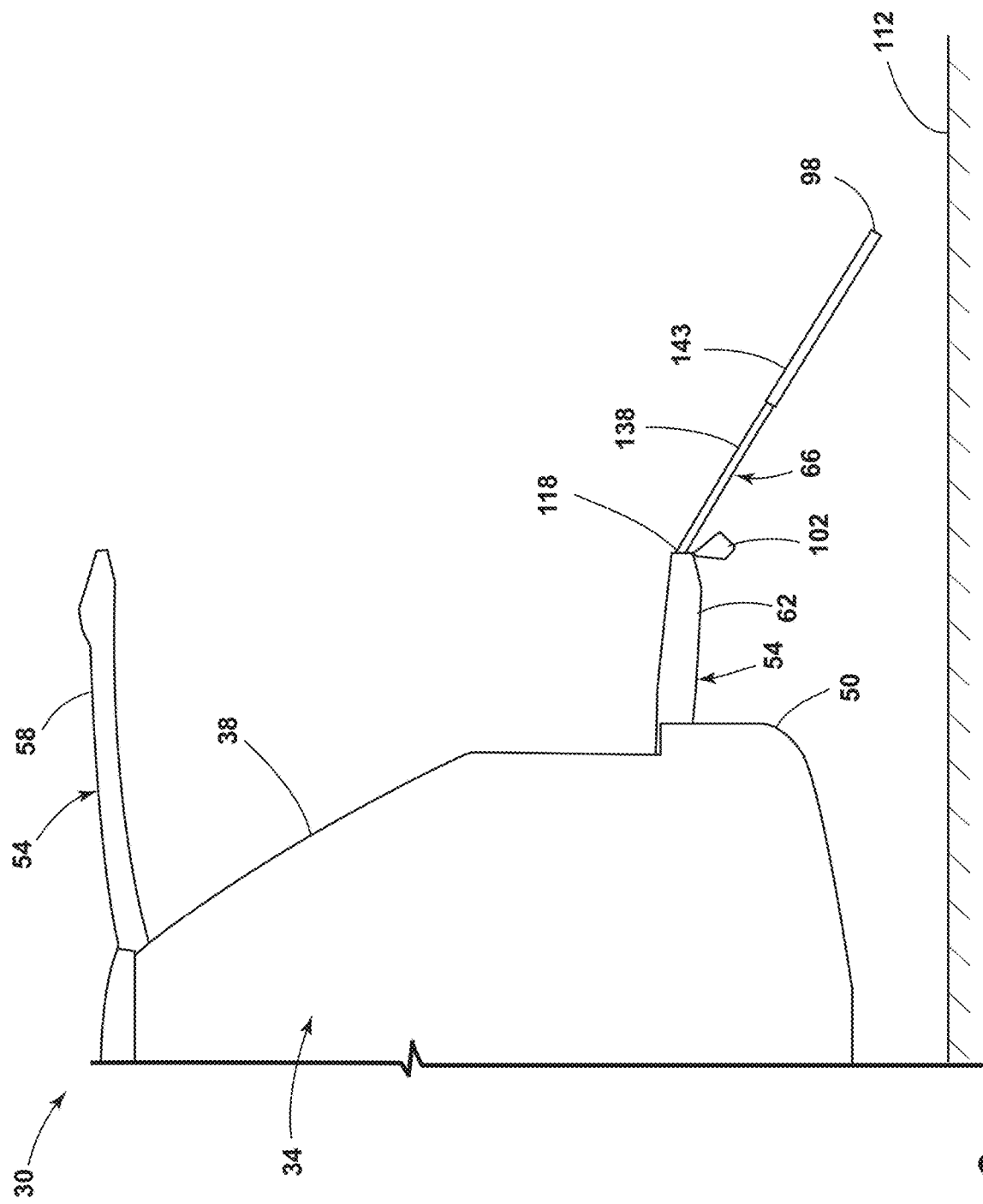
FIG. 6 is a side view of the rear of the vehicle, illustrating the load ramp in the extended position, according to another example.
Figure 7:
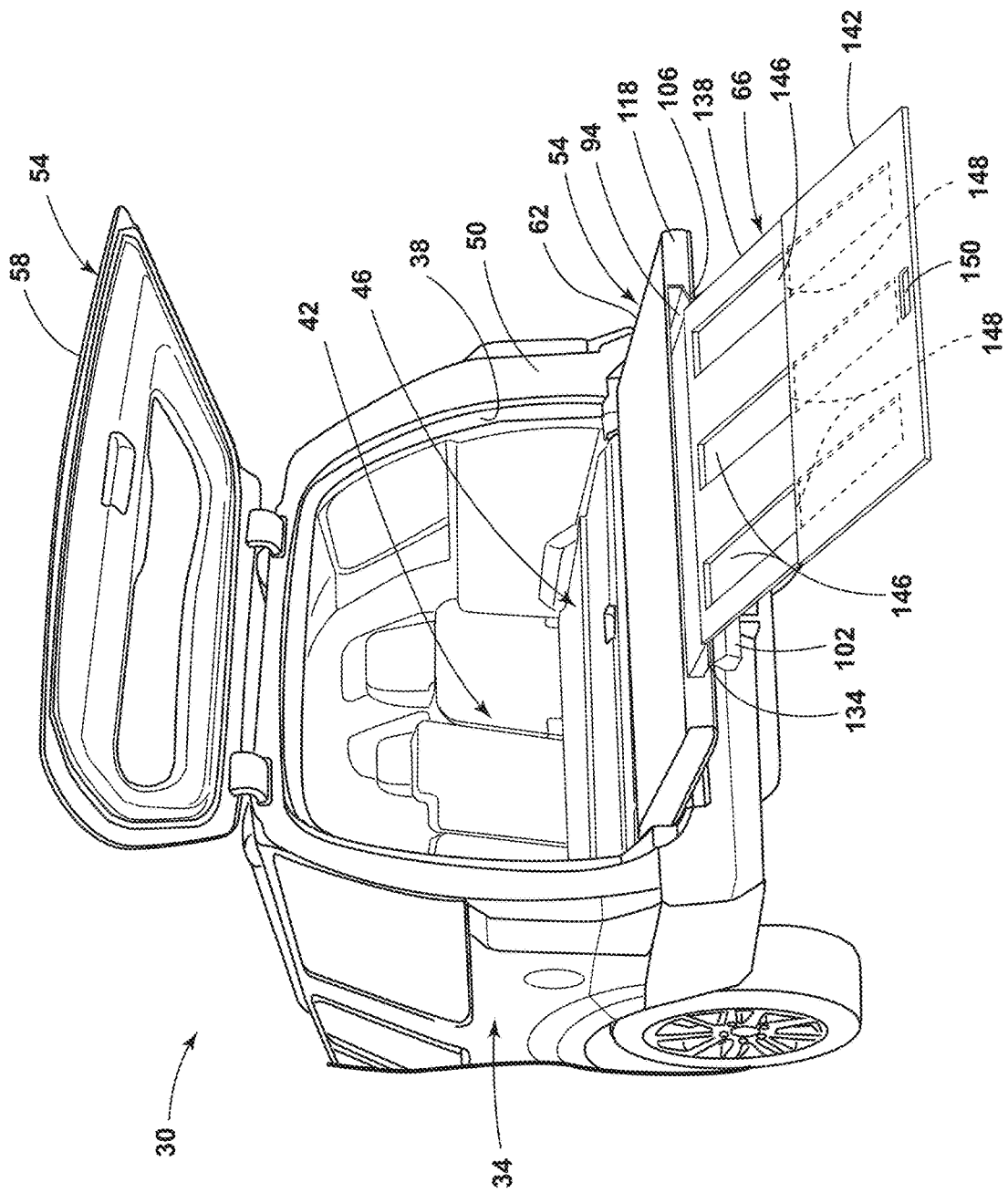
FIG. 7 is a rear perspective view of the vehicle, illustrating the load ramp of FIG. 6 in the extended position, according to one example.
Figure 8:
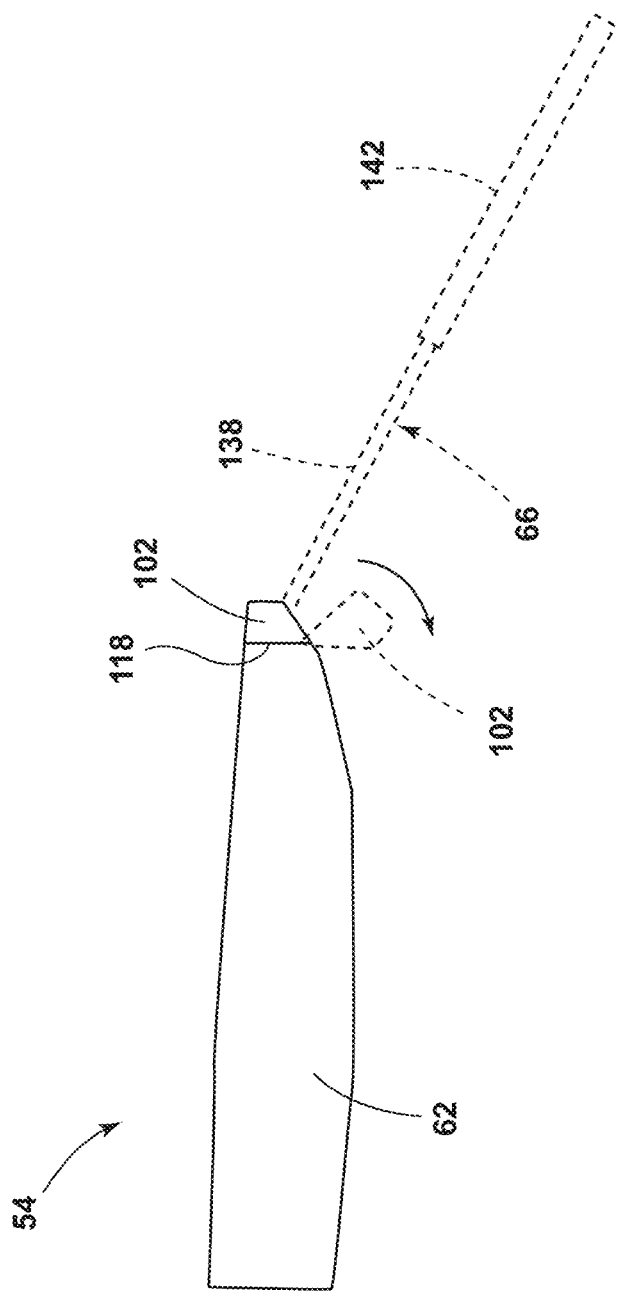
FIG. 8 is a side view of the lower closure panel, illustrating the load ramp in a retracted position with the extended position depicted in dashed lines, according to one example.

Referring now to FIGS. 3-5, the lower closure panel 62 can define a cavity 94 therein. The load ramp 66 can be operable between a retracted position and an extended position. When in the retracted position, the load ramp 66 is received within the cavity 94. Transitioning the load ramp 66 from the retracted position to the extended position can be done in a manual or automated fashion. In the depicted example, a free end 98 of the load ramp 66 can include a closeout structure 102 coupled thereto. The closeout structure 102 can be utilized to cover an opening 106 or mouth of the cavity 94, through which the load ramp 66 is moved when actuated between the retracted position and the extended position. The free end 98 of the load ramp 66 may be opposite to a coupled end 110 of the load ramp 66. More specifically, the coupled end 110 may remain directly coupled to the lower closure panel 62 in both the retracted position and the extended position. The free end 98 of the load ramp 66 may be a rearward-most portion of the load ramp 66 when the load ramp 66 is in the extended position and the lower closure panel 62 is in the open position. In some examples, the free end 98 of the load ramp 66 may remain suspended above a support surface 112 upon which the vehicle 30 rests when the load ramp 66 is in the extended position (see FIG. 4). In such an example, the load ramp 66 may be placed in the extended position to provide easier access to the passenger compartment 42 and/or the cargo area 46 for a user. In various examples, the user may be a pet 114 and/or the owner of the pet 114.

Referring again to FIGS. 3-5, when in the extended position, the coupled end 110 of the load ramp 66 can protrude from a free edge 118 of the lower closure panel 62. The free edge 118 may be opposite a coupled edge 122 of the lower closure panel 62. The coupled edge 122 of the lower closure panel 62 is adjacent to the passenger compartment 42 and/or the cargo area 46. In various examples, the coupled edge 122 of the lower closure panel 62 can define a pivot axis or rotational axis of the lower closure panel 62 about which the lower closure panel 62 rotates in transitioning between the open position and the closed position. In some examples, the free end 98 of the load ramp 66 may contact the support surface 112 (e.g., the ground) upon which the vehicle 30 rests such that a cargo item may be transitioned from the support surface 112 upon which the vehicle 30 rests to the load ramp 66 with less vertical displacement of the cargo item during the transition from the support surface 112 to the load ramp 66 than is present in examples where the load ramp 66 does not contact the support surface 112. In various examples, a presented surface of the load ramp 66 may be provided with one or more traction members 126 that can be utilized in aiding the pet 114 and/or the cargo item to be loaded into the vehicle 30 in traversing a length 130 of the load ramp 66. The length 130 of the load ramp 66 may include the closeout structure 102.

Referring to FIGS. 6-9, in some examples, the closeout structure 102 that covers the opening 106 of the cavity 94 can be rotatably coupled to the free edge 118 of the lower closure panel 62. For example, the closeout structure 102 can be coupled to the free edge 118 by a hinge 134. In various examples, the load ramp 66 can be provided with a first section 138 and a second section 142. In the depicted example, the first section 138 is received within the second section 142. For example, the second section 142 may define a cavity similar to the cavity 94 of the lower closure panel 62. In such an example, the second section 142 is movable relative to the first section 138. More specifically, the second section 142 may be actuated between a retracted position and an extended position by telescopically sliding the second section 142 relative to the first section 138.

Referring again to FIGS. 6-9, in some examples, the first section 138 can define depressions 146 that can increase a degree of rigidity of the first section 138. Alternatively, the depressions 146 can be utilized as a loading aid for cargo items to be loaded into the vehicle 30. It is contemplated that one or more tabs 148 may be provided upon an interior edge of the second section 142 that engages with the depressions 146 such that the tabs 148 guide actuation of the second section 142 relative to the first section 138 in transitioning between the retracted and extended positions. In such an example, the tabs 148 that engage with the depressions 146 may also prevent the second section 142 from becoming decoupled from the first section 138 by an overextension of the second section 142 relative to the first section 138 when in the extended position. Deployment of the load ramp 66 and/or the second section 142 may be accomplished in a manual manner or a powered manner. In either example, a handle 150 may be defined by the load ramp 66 that a user can utilize to actuate the second section 142 relative to the first section 138 and/or deploy the load ramp 66 from the cavity 94. In some examples, the load ramp 66 may be deployed with a combination of powered and manual actuation. For example, the load ramp 66 may be deployed from the cavity 94 by powered actuation while the second section 142 is extended from the first section 138 by manual actuation. As with the preceding example, the load ramp 66 may be configured such that the free end 98 of the load ramp 66 does not contact the support surface 112 upon which the vehicle 30 rests when the load ramp 66 is in the extended position and the second section 142 is in the deployed position (see FIG. 6).

Figure 10B:
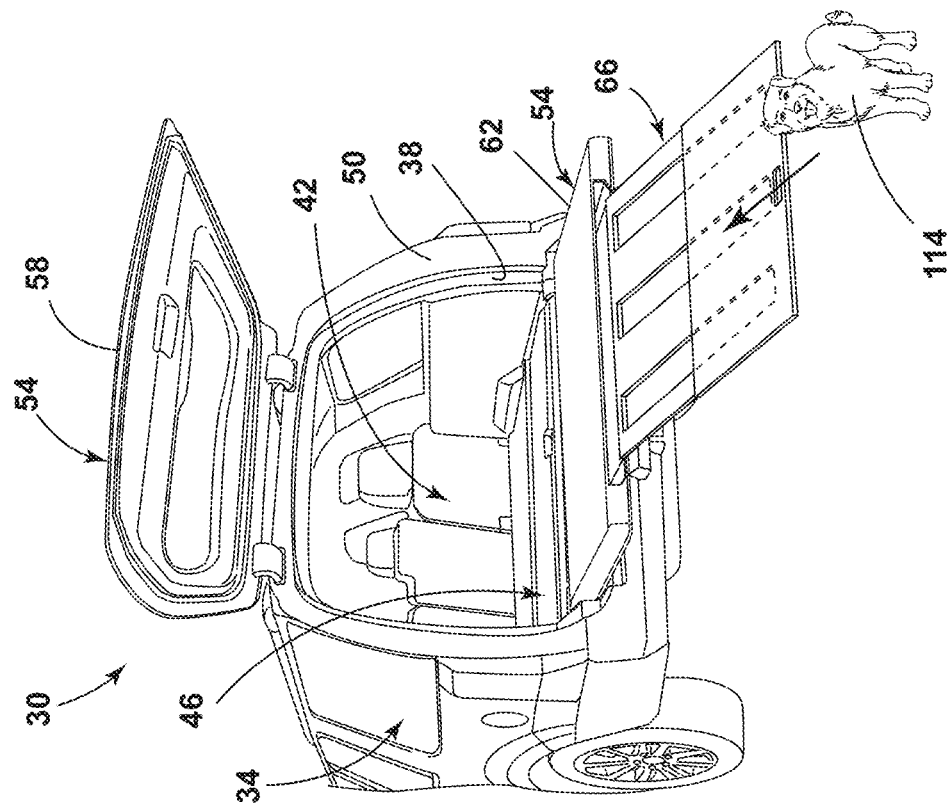
FIG. 10B is a rear perspective view of the vehicle, illustrating the pet on a support surface upon which the vehicle is resting.
Figure 10A:
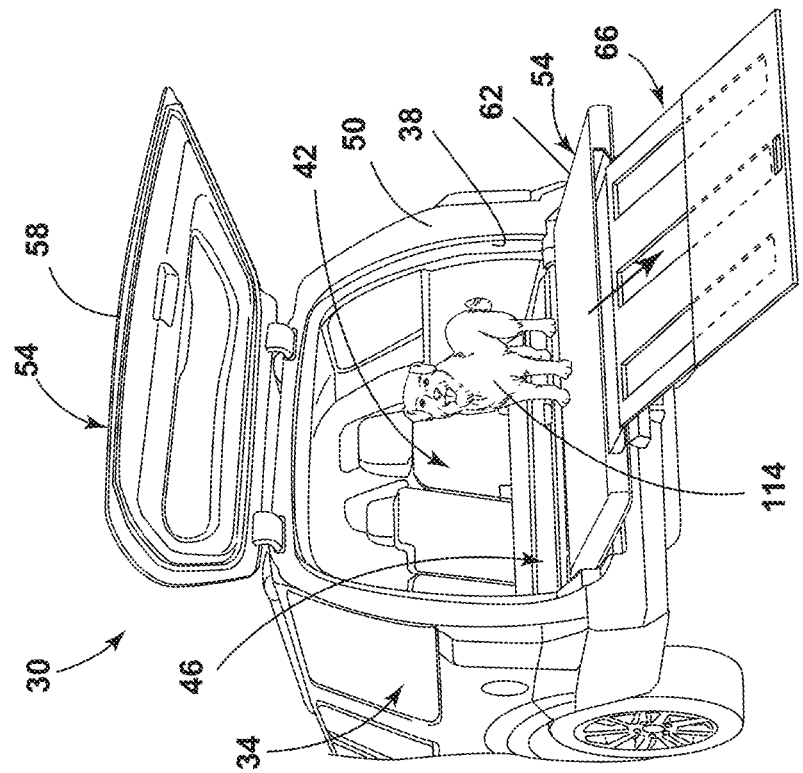
FIG. 10A is a rear perspective view of the vehicle, illustrating the pet within a cargo area of the vehicle.
Figure 11:
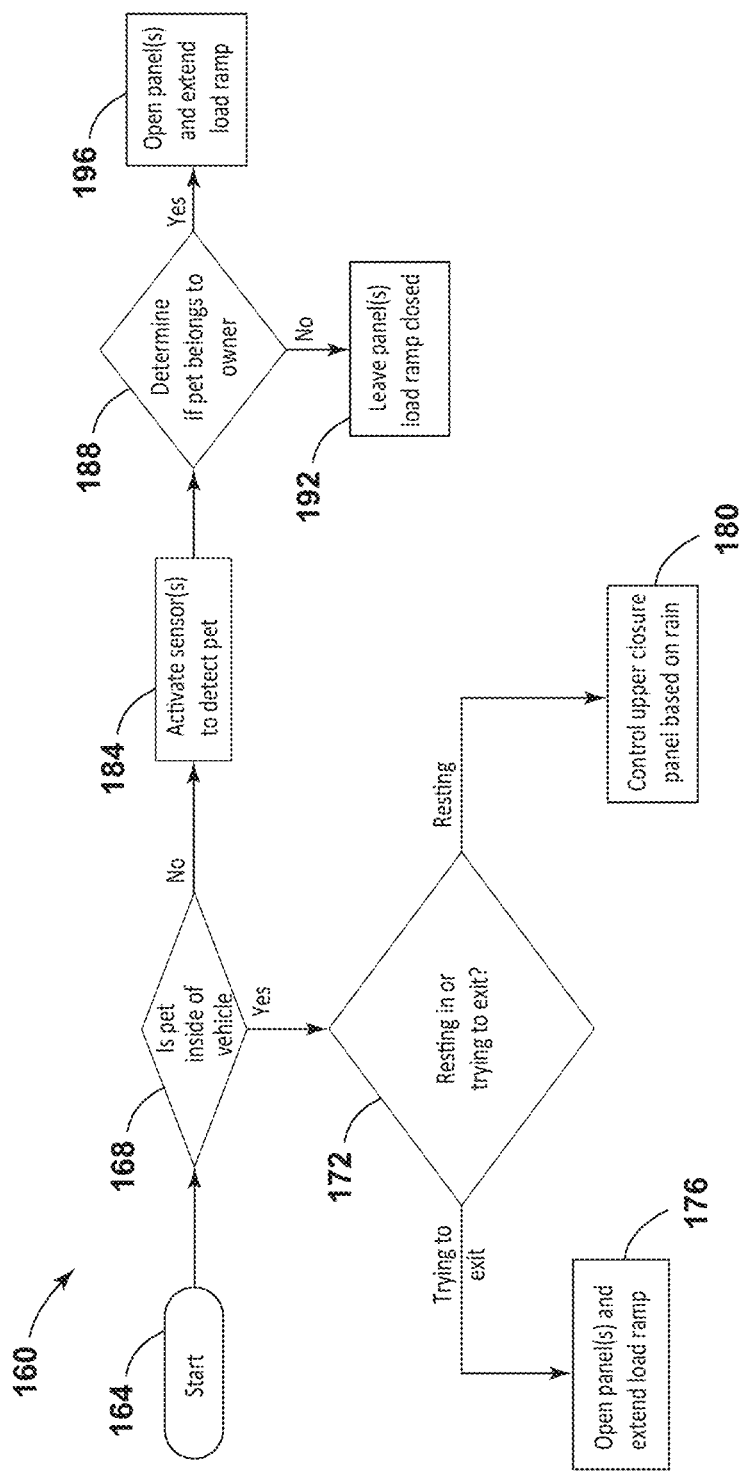
FIG. 11 is a flow diagram illustrating a method of actuating the load ramp, according to one example.
Figure 12:
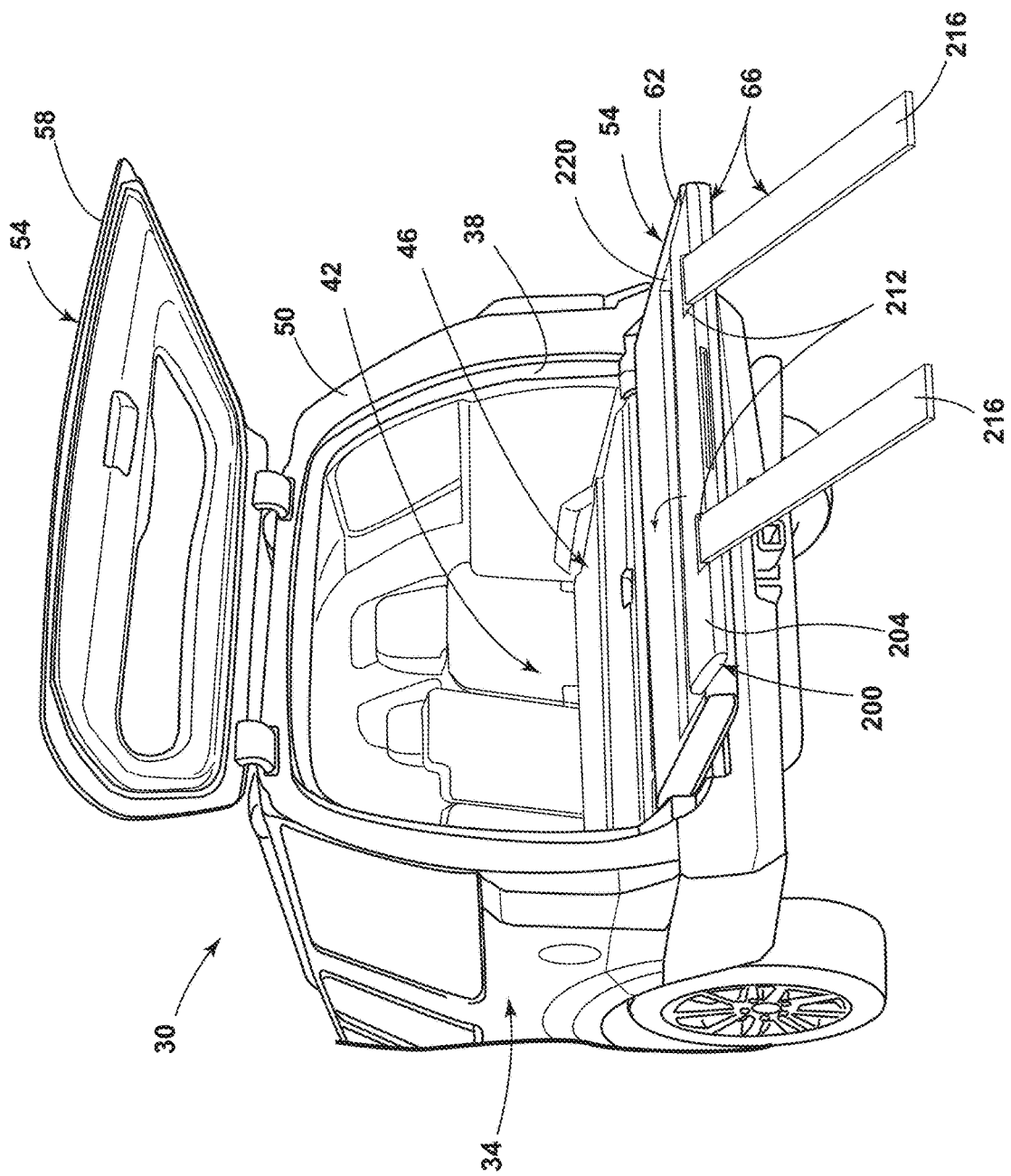
FIG. 12 is a rear perspective view of the vehicle, illustrating an exterior auxiliary panel coupled to the lower closure panel and in a deployed position, according to one example.
Figure 13:
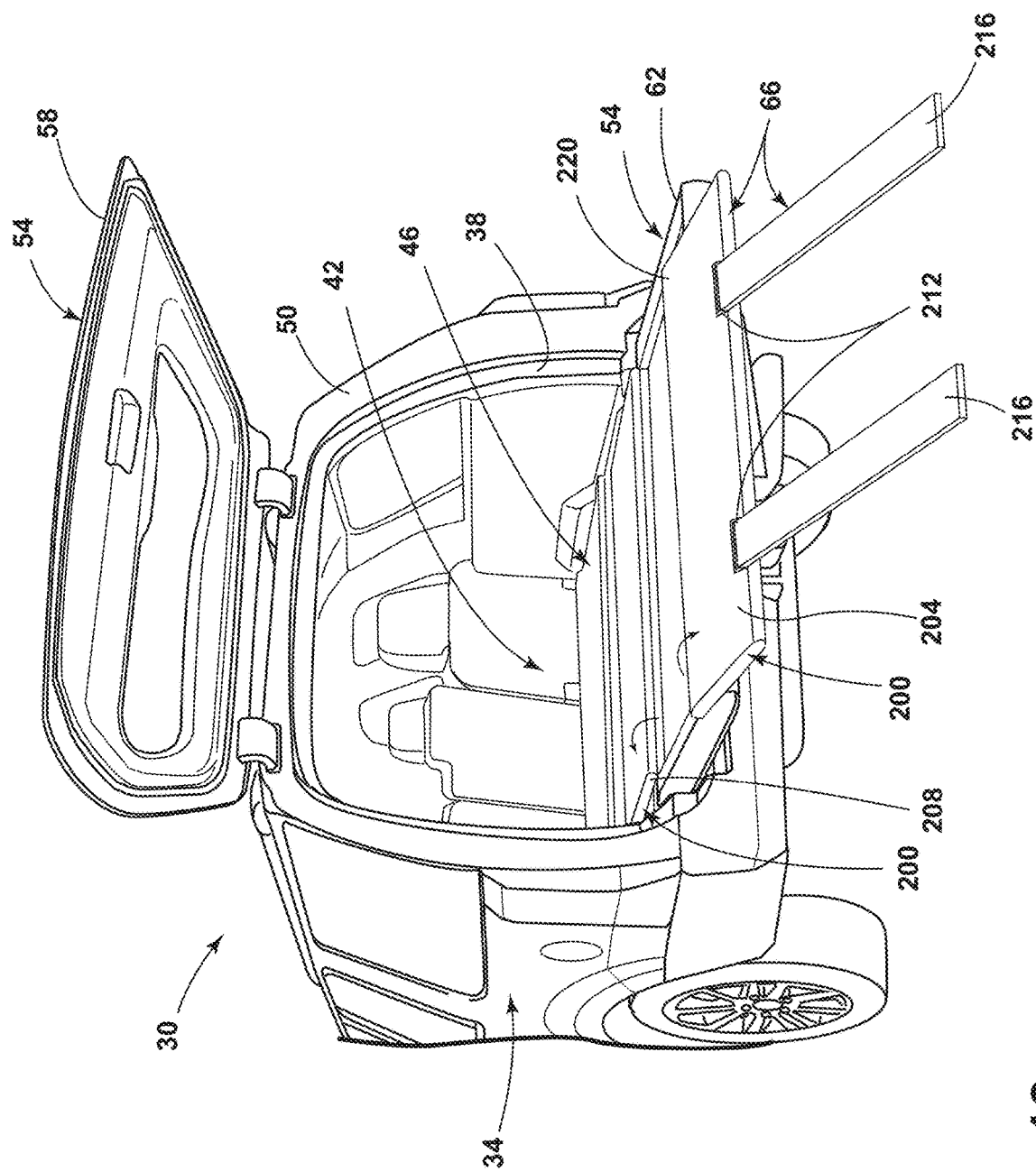
FIG. 13 is a rear perspective view of the vehicle, illustrating the exterior auxiliary panel and an interior auxiliary panel coupled to the lower closure panel and each in a deployed position, according to one example.
Figure 14:
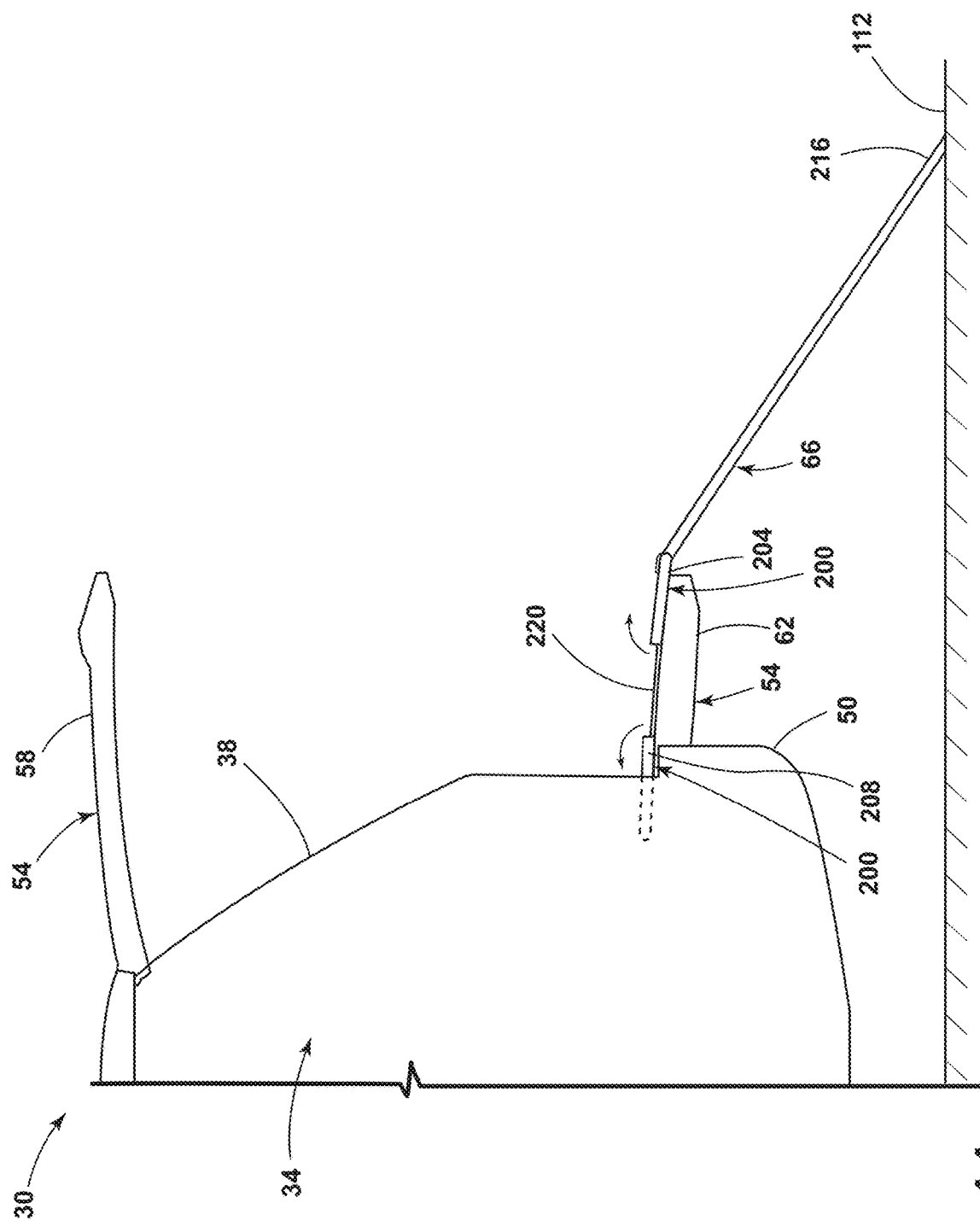
FIG. 14 is a side view of the vehicle, illustrating the exterior auxiliary panel and the interior auxiliary panel coupled to the lower closure panel and each in the deployed position, according to one example.

Referring now to FIGS. 10A-11, an exemplary execution of a method 160 of actuating the load ramp 66 is depicted. The method 160 can begin at starting point 164 and advanced to decision point 168 of determining whether the pet 114 is inside of the vehicle 30. For example, the vehicle 30 may be provided with one or more imagers (e.g., cameras) that are referenced at decision point 168 to determine whether the pet 114 is inside of the vehicle 30. The one or more imagers can be arranged to monitor the cargo area 46 and/or an area that is adjacent and exterior to the rear 50 of the vehicle 30. For example, the one or more imagers can be positioned on an interior surface of one of the closure panels 54, on an exterior surface of one of the closure panels 54, within the cargo area 46, within the passenger compartment 42, and/or any other suitable location that facilitates monitoring the cargo area 46 and/or the area that is adjacent and exterior to the rear 50 of the vehicle 30. If the method 160 determines at decision point 168 that the pet 114 is inside of the vehicle 30, then the method 160 may advance to decision point 172 of determining whether the pet 114 is resting or trying to exit the vehicle 30. If the method 160 determines at decision point 172 that the pet 114 is trying to exit the vehicle 30, then the method 160 may advance to step 176 of opening the upper closure panel 58 and/or the lower closure panel 62 and extending the load ramp 66. Determining that the pet 114 is attempting to exit the vehicle 30 at decision point 172 may be accomplished by referencing one or more imagers provided on the vehicle 30. For example, one or more of the imagers may register movement outside of the vehicle 30 (e.g., an owner/user approaching the vehicle 30), the pet 114 standing for X amount of time, or the pet 114 pawing, scratching, or otherwise interacting with the lower closure panel 62 in a manner that indicates a desire to exit the vehicle 30. If the method 160 determines at decision point 172 that the pet 114 is resting within the vehicle 30, the method 160 may advance to step 180 of controlling a position of the upper closure panel 58. For example, the position of the upper closure panel 58 may be adjusted based on input from a rain sensor and/or a light sensor that provides an indication of the environmental conditions exterior to the vehicle 30, as well as environmental conditions interior to the vehicle 30. For example, if the rain sensor indicates that the environment exterior to the vehicle 30 includes precipitation, then the upper closure panel 58 may be adjusted in its position to prevent rain or precipitation from entering the vehicle 30 and/or negatively impacting the rest of the pet 114. Alternatively, the position of the upper closure panel 58 may be adjusted based upon input from a day/night sensor and/or one or more of the imagers to ensure the area within the vehicle 30 where the pet 114 is located (e.g., the cargo area 46) is covered in shade rather than awash with light from the exterior of the vehicle 30.

Referring again to FIGS. 10A-11, if the method 160 determines at decision point 168 that the pet 114 is not inside of the vehicle 30, then the method 160 may advance to step 184 of activating one or more sensors to determine the presence of the pet 114. For example, the one or more sensors can include the one or more imagers, radar, and the like to determine the presence of the pet 114 If method 160 determines at step 184 that the pet 114 is in dose proximity to the vehicle 30 as a result of activating the one or more sensors to detect the pet 114, then the method 160 may advance to decision point 188 of determining if the pet 114 belongs to the owner of the vehicle 30. Decision point 188 may determine that the pet 114 belongs of the owner of the vehicle 30 by referencing data stored within the vehicle 30 (e.g., within a memory of a controller). The data can include, but is not limited to, an RFID tag attached to a collar of the pet 114, a body shape of the pet 114, a body size of the pet 114, and/or any other identifiable trait or information relating to the pet 114. If decision point 188 determines that the pet 114 does not belong to the owner of the vehicle 30, then the method 160 may advance to step 192 where the closure panels 54 remain in the closed position and the load ramp 66 remains in the retracted position. However, if decision point 188 determines that the pet 114 does belong to the owner of the vehicle 30, then the method 160 may advance to step 196 of opening one or more of the closure panels 54 and extending the load ramp 66 to the pet 114.

Figure 15:
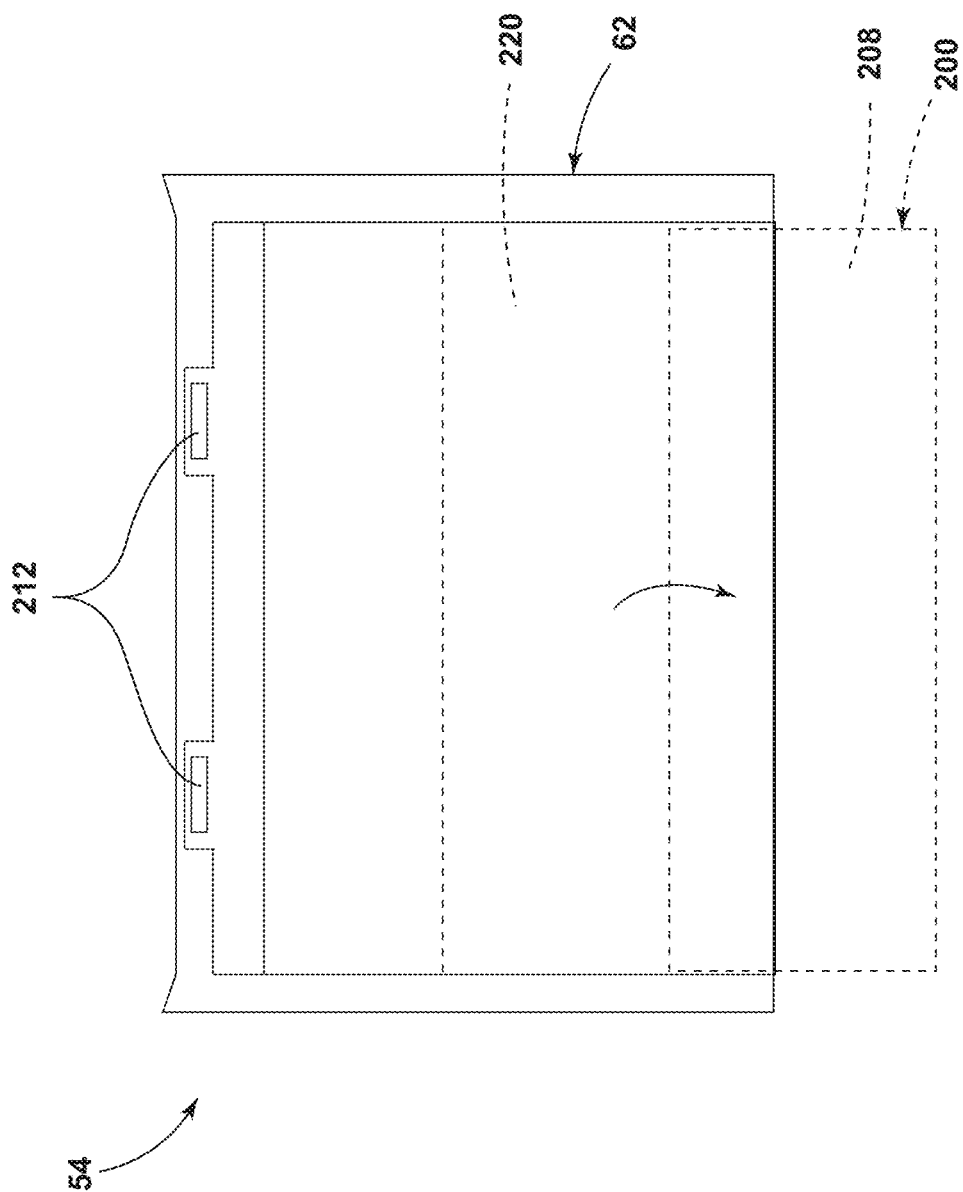
FIG. 15 is a top schematic view of the interaction between the lower closure panel and the interior auxiliary panel, according to one example.
Figure 16:
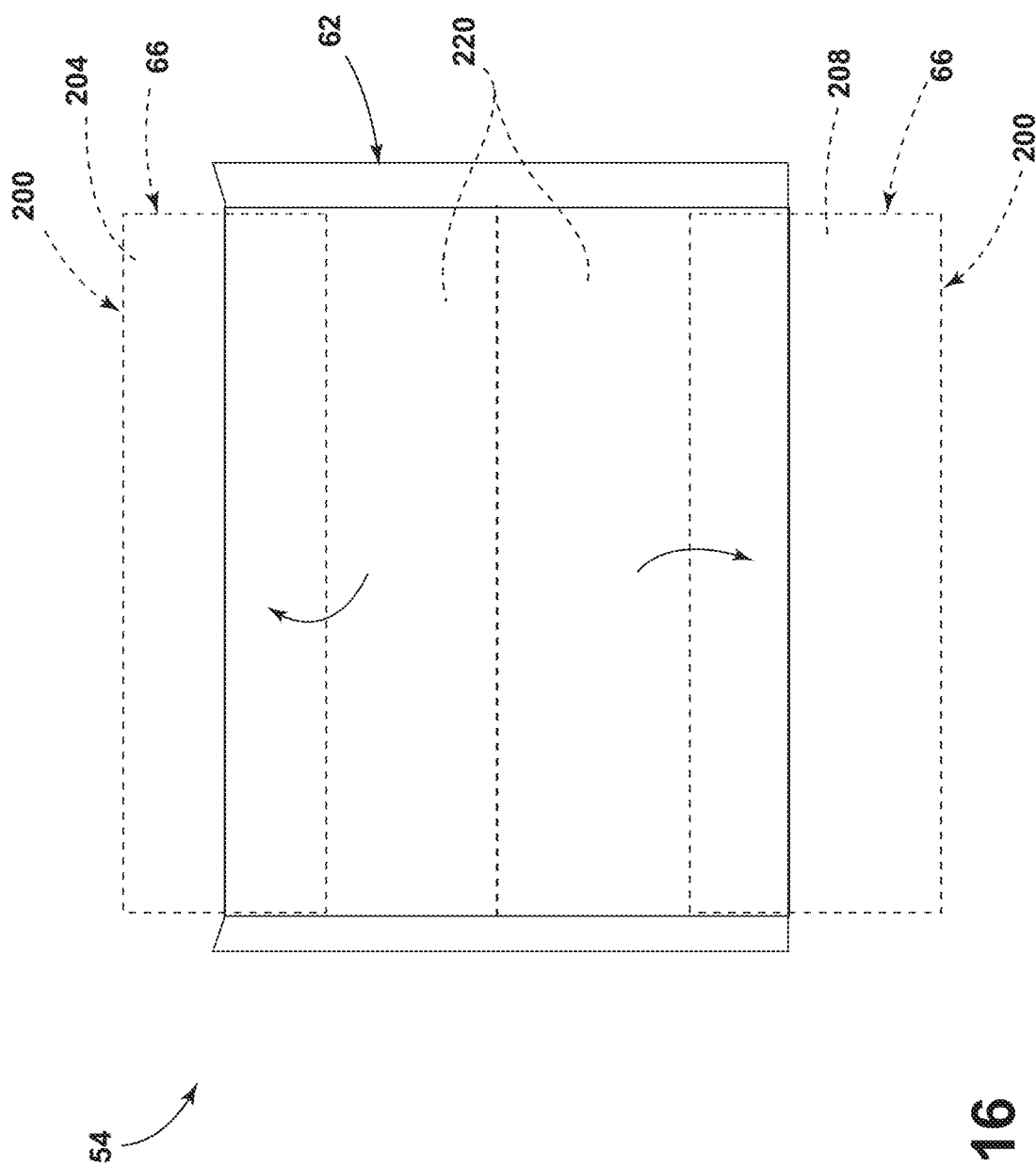
FIG. 16 is a top schematic view of the interaction between the lower closure panel and the exterior and interior auxiliary panels, according to one example.

Referring to FIGS. 12-16, in some examples, the lower closure panel 62 can be provided with one or more auxiliary panels 200. For example, the lower closure panel 62 may be provided with an exterior auxiliary panel 204 and/or an interior auxiliary panel 208. The exterior auxiliary panel 204 can define one or more receptacles 212. In some examples, the one or more receptacles 212 may be defined by the lower closure panel 62 such that the exterior auxiliary panel 204 is omitted (see FIG. 15), The one or more receptacles 212 can each receive a planar member 216. The planar member 216 can extend downwardly and away from the lower closure panel 62 and may contact the support surface 112 upon which the vehicle 30 rests. Alternatively, the planar member 216 may be suspended above the support surface 112 upon which the vehicle 30 rests. The exterior auxiliary panel 204 and/or the planar member 216 may constitute the load ramp 66 in the depicted examples. In the example of FIG. 15 that omits the exterior auxiliary panel 204, the planar member 216 and the lower closure panel 62 may constitute the load ramp 66. In examples that include the interior auxiliary panel 208, the interior auxiliary panel 208 may extend from the lower closure panel 62 into the passenger compartment 42 and/or the cargo area 46, The extension of the interior auxiliary panel 208 from the lower closure panel 62 to the passenger compartment 42 and/or the cargo area 46 may provide a transition surface between the lower closure panel 62 and the passenger compartment 42 and/or the cargo area 46.

Referring again to FIGS. 12-16, the auxiliary panels 200 may be rotatably coupled to the lower closure panel 62 such that the auxiliary panels 200 (e.g., exterior auxiliary panel 204 and/or interior auxiliary panel 208) are movable between a stowed position and a deployed position. In various examples, the lower closure panel 62 may be provided with a recess 220 that corresponds in size and depth to the auxiliary panels) 200. Accordingly, when the one or more auxiliary panels 200 are in the stowed position, an interior surface of the lower closure panel 62 may be generally planar. The terms exterior and interior utilized in the exterior auxiliary panel 204 and the interior auxiliary panel 208 can refer to a direction in which the given auxiliary panel 200 extends when in the deployed position relative to the lower closure panel 62 and/or the vehicle 30.

Figure 17:
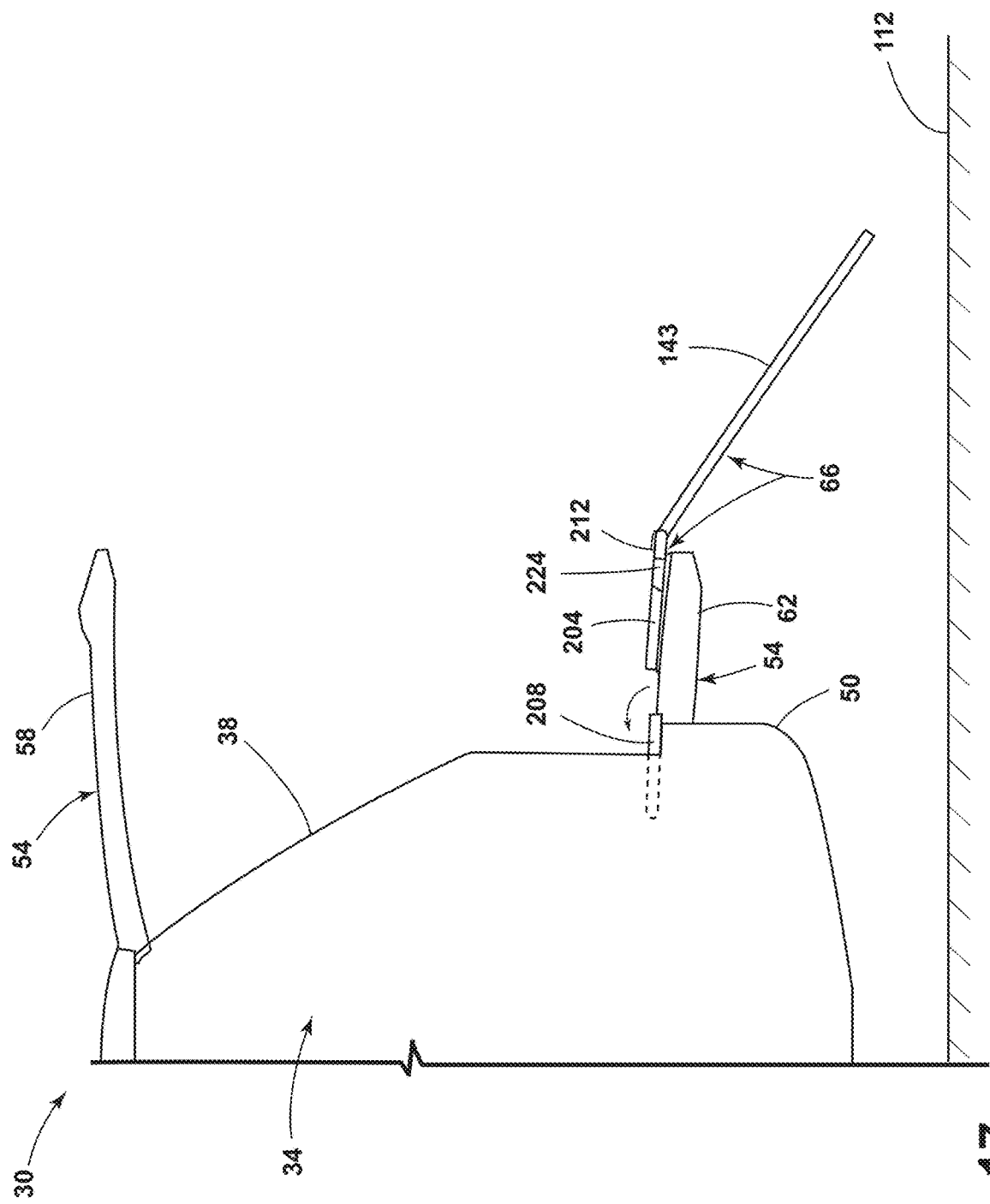
FIG. 17 is a side view of the vehicle, illustrating the exterior auxiliary panel and the interior auxiliary panel coupled to the lower closure panel and each in the deployed position, according to another example.
Figure 18:
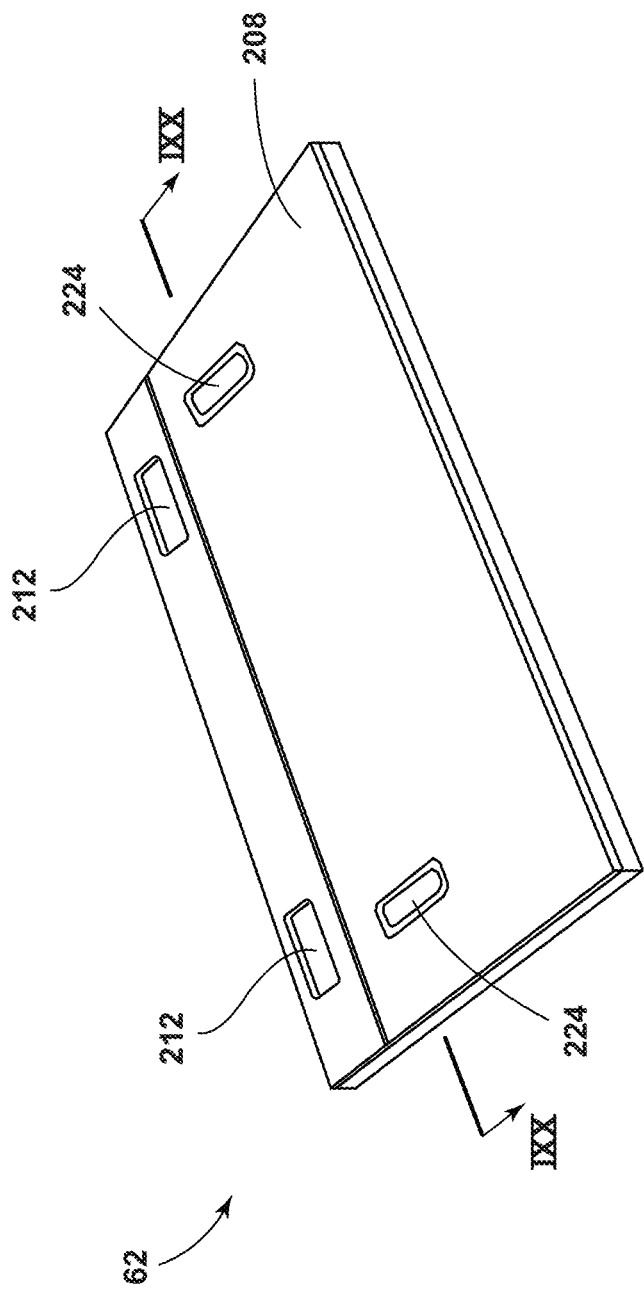
FIG. 18 is a top perspective view of the lower closure panel, illustrating apertures that can be utilized in transitioning the exterior closure panel between the stowed position and the deployed position.
Figure 19:
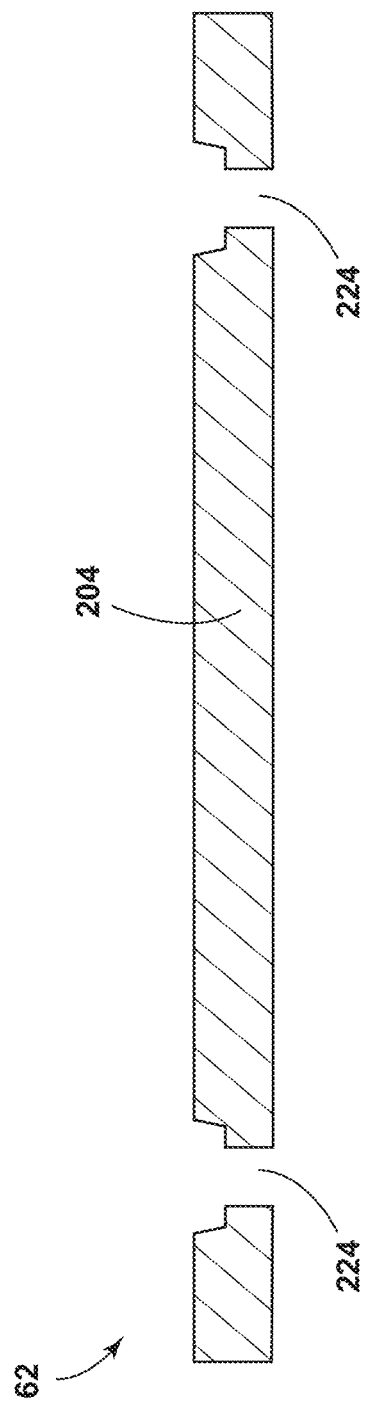
FIG. 19 is a cross-sectional view of the lower closure panel, taken along line IXX-IXX of FIG. 18, according to one example.

Referring to FIGS. 17-19, the vehicle 30 is depicted with the upper and lower closure panels 58, 62 both in the open position. Additionally, the vehicle 30 is depicted with the exterior auxiliary panel 204 and the interior auxiliary panel 208 each in the deployed position. As with the previous examples, the exterior auxiliary panel 204 and/or the lower closure panel 62 can define the receptacles 212 that receive the planar members 216. In the depicted example, the interior auxiliary panel 208 defines one or more actuation apertures 224. The user can utilize the one or more actuation apertures 224 to transition the interior auxiliary panel 208 from the stowed position to the deployed position by reaching a hand into the actuation aperture 224 and applying an upward force to the interior auxiliary panel 208 when the interior auxiliary panel 208 is in the stowed position. In some examples, the one or more actuation apertures 224 may extend through an entirety of the thickness of the interior auxiliary panel 208, The exterior auxiliary panel 204, when employed, may similarly be provided with one or more of the actuation apertures 224 or another suitable structure that aids in deployment from the stowed position to the deployed position.

Figure 20:
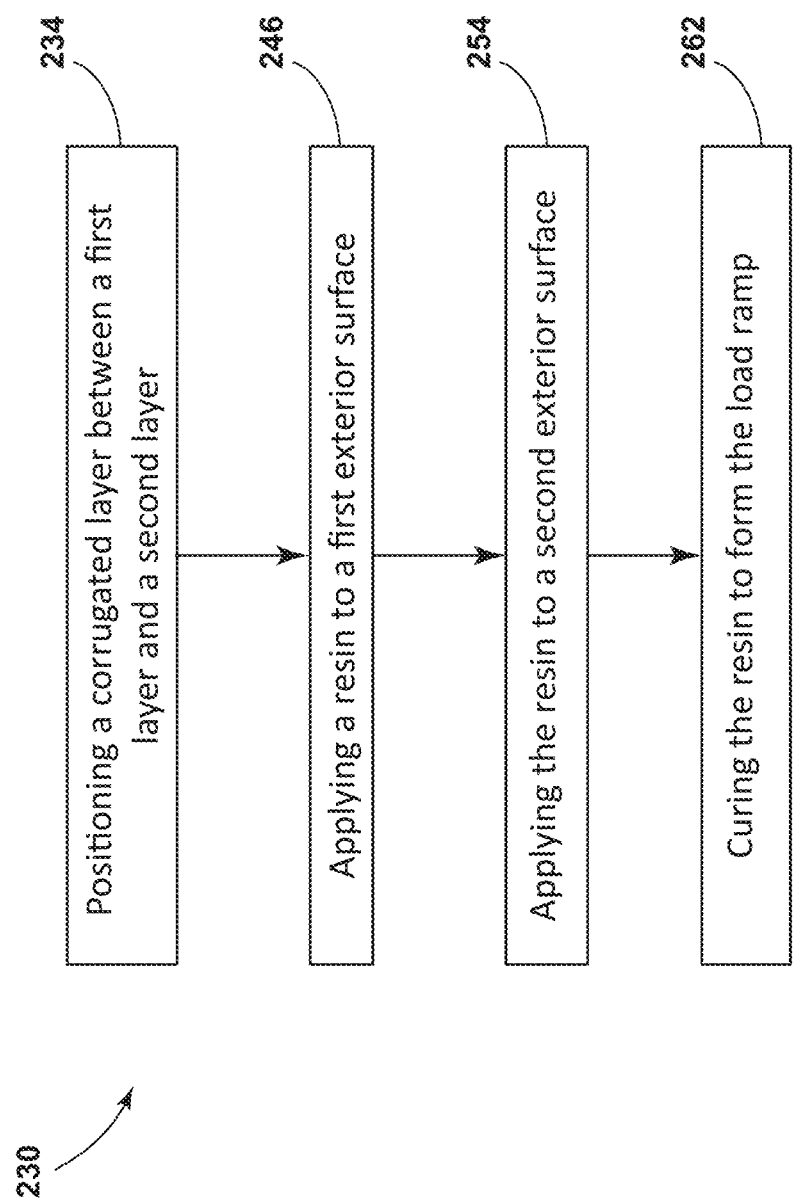
FIG. 20 is a flow diagram of a method of manufacturing the load ramp for the vehicle, according to one example.
Figure 21:
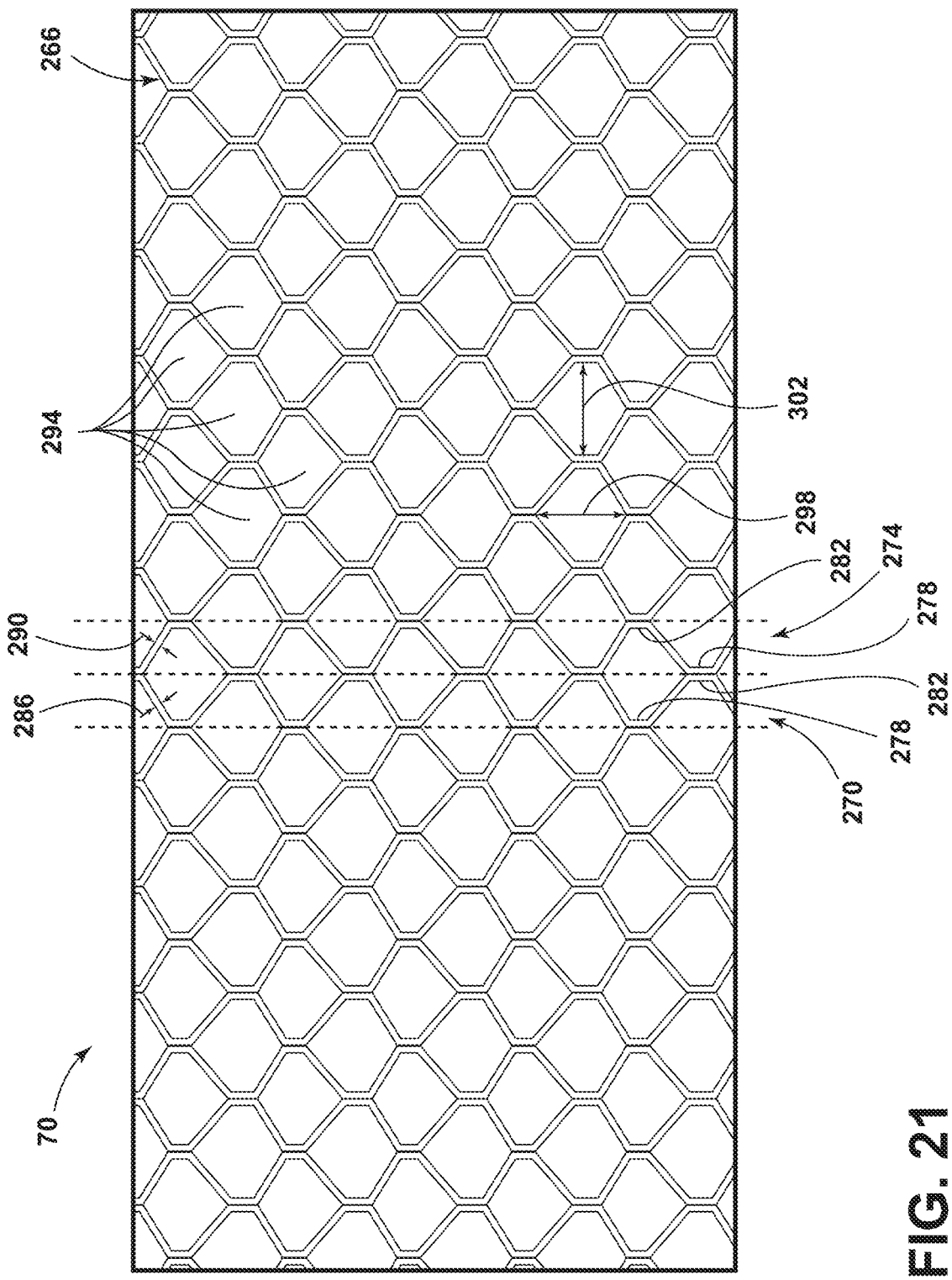
FIG. 21 is a top view of a corrugated layer of the load ramp, illustrating a series of cells, according to one example.
Figure 22:
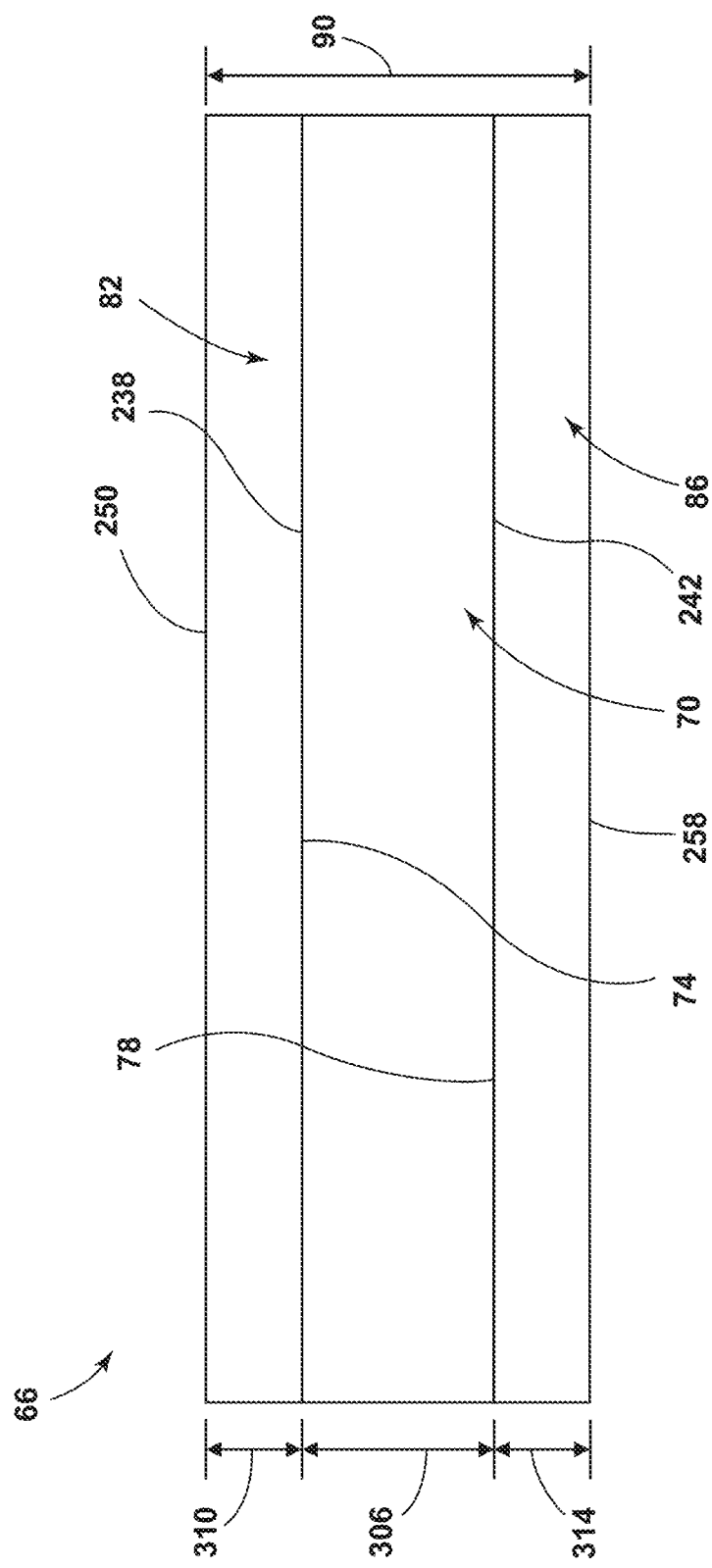
FIG. 22 is a cross-sectional view of the load ramp, taken along line XXII-XXII of FIG. 3, according to one example.

Referring now to FIGS. 20-22, a method 230 of manufacturing the load ramp 66 can include step 234 of positioning the corrugated layer 70 between the first layer 82 and the second layer 86 such that the corrugated layer 70 is in contact with a first interior surface 238 of the first layer 82 and a second interior surface 242 of the second layer 86. Accordingly, the first interior surface 238 of the first layer 82 can be adjacent to the first surface 74 of the corrugated layer 70. Similarly, the second interior surface 242 of the second layer 86 can be adjacent to the second surface 78 of the corrugated layer 70. The method 230 can also include step 246 of applying a resin to a first exterior surface 250 of the first layer 82. In various examples, an amount of the resin that is applied can be sufficient to permeate the first layer 82 such that the resin comes into contact with the corrugated layer 70 (e.g., the first surface 74). Similarly, the method 230 can include step 254 of applying the resin to a second exterior surface 258 of the second layer 86. As with the application of the resin to the first layer 82, an amount of the resin applied to the second layer 86 can be sufficient to permeate the second layer 78 such that the resin comes into contact with the corrugated layer 70 (e.g., the second surface 78). The method 230 can further include step 262 of curing the resin to form the load ramp 66 for the vehicle 30. In various examples, the method 230 can also include a step where excess material is trimmed from the load ramp 66 (e.g., trimmed from a perimeter). The method 230 may also include a step of molding one or more structures into the load ramp 66 (e.g., the receptacles 212, the actuation apertures 224, etc.), Referring again to FIGS. 20-22, the step 262 of curing the resin to form the load ramp 66 for the vehicle 30 can include heating the first layer 82, the corrugated layer 70, and the second layer 86 to a temperature in the range of about 150° C. to about 180° C. In some examples, the temperature that the first layer 82, the corrugated layer 70, and the second layer 86 is heated to can be in the range of about 150° C. to about 160° C. In one specific example, the temperature that the first layer 82, the corrugated layer 70, and the second layer 86 is heated to can be 155° C. In various examples, the step 262 of curing the resin to form the load ramp 66 for the vehicle 30 can include exposing the first layer 82, the corrugated layer 70, and the second layer 86 to a pressure in the range of about 100 tons (90.7 metric tons) to about 400 tons (362.9 metric tons). For example, the pressure can be in the range of about 250 tons (226.8 metric tons) to about 350 tons (317.5 metric tons). In one specific example, the pressure can be 300 tons (272.2 metric tons).

Referring further to FIGS. 20-22, the corrugated layer 70 defines a honeycomb structure 266. The honeycomb structure 266 includes a first sheet 270 and a second sheet 274. The first and second sheets 270, 274 are adjacent to one another and each include ridges 278 and valleys 282. The interaction between the first and second sheets 270, 274 define a pattern that is repeated throughout the corrugated layer 70 to define the honeycomb structure 266. A thickness 286 of the first sheet 270 and a thickness 290 of the second sheet 274 can each be in the range of about 0.5 mm to about 2.0 mm. For example, the thicknesses 286, 290 can be about 0.5 mm, about 0.6 mm, about 0.7 mm, about 0.8 mm, about 0.9 mm, about 1.0 mm, about 1.1 mm, about 1.2 mm, about 1.3 mm, about 1.4 mm, about 1.5 mm, about 1.6 mm, about 1.7 mm, about 1.8 mm, about 1.9 mm, or about 2.0 mm. The ridges 278 of the first sheet 270 can contact the valleys 282 of the second sheet 274 in an alternating fashion such that a series of cells 294 are defined by the first sheet 270 and the second sheet 274. A length 298 of each cell 294 in the series of cells 294 can be in the range of about 10 mm to about 20 mm. For example, the length 298 of each cell 294 can be about 10 mm, about 11 mm, about 12 mm, about 13 mm, about 14 mm, about 15 mm, about 16 mm, about 17 mm, about 18 mm, about 19 mm, or about 20 mm. A width 302 of each cell 294 in the series of cells 294 can be in the range of about 5 mm to about 15 mm. For example, the width 302 of each cell 294 can be about 5 mm, about 6 mm, about 7 mm, about 8 mm, about 9 mm, about 10 mm, about 11 mm, about 12 mm, about 13 mm, about 14 mm, or about 15 mm. The thickness 306 of the corrugated layer 70 can be in the range of about 5 mm to about 15 mm. For example, the thickness 306 of the corrugated layer 70 can be about 5 mm, about 6 mm, about 7 mm, about 8 mm, about 9 mm, about 10 mm, about 11 mm, about 12 mm, about 13 mm, about 14 mm, or about 15 mm. The thickness 90 of the load ramp 66 can be in the range of about 10 mm to about 30 mm. For example, the thickness 90 of the load ramp 66 can be about 10 mm, about 12 mm, about 14 mm, about 16 mm, about 18 mm, about 20 mm, about 22 mm, about 24 mm, about 26 mm, about 28 mm, or about 30 mm. A thickness 310 of the first layer 82 and a thickness 314 of the second layer 86 can be in the range of about 1 mm to about 10 mm. For example, the thickness 310 of the first layer 82 and the thickness 314 of the second layer 86 can be about 1 mm, about 2 mm, about 3 mm, about 4 mm, about 5 mm, about 6 mm, about 7 mm, about 8 mm, about 9 mm, or about 10 mm. Once finished, a load capacity of the load ramp 66 can be at least about 100 kg. For example, the load capacity of the load ramp 66 can be at least about 100 kg, at least about 150 kg, at least about 200 kg, at least about 250 kg, at least about 300 kg.

Referring again to FIGS. 20-22, the corrugated layer 70 can be made from a processed cellulose fiber (e.g., a paper product). The first layer 82 and/or the second layer 86 can be made of a variety of fiber-based products. For example, the fiber-based products can include, but are not limited to, fiberglass, basalt fiber, and/or carbon fiber. In various examples, the first layer 82 and the second layer 86 can be made of the same fiber-based product or products. In some examples, the resin utilized can be polyurethane. For example, the resin can be a two-part polyurethane. The resin can tie together individual strands of the fiber-based product (s) of the first and second layers 82, 86, as well as provide desirable surface characteristics for the load ramp 66 (e.g., aesthetic appeal, increased strength, increased stiffness). The use of the resin can also enable providing a grained surface to the load ramp 66. For example, the grained surface may be textured and/or provide an increase to a coefficient of friction for the surface of the load ramp 66. In various examples, the resin may be fully cured in less than one minute. For example, the resin may be fully cured in about thirty seconds. In some examples, a decorative layer may be applied to the surface of the load ramp 66. The decorative layer can be, but is not limited to, a carpet layer, a thermoplastic vulcanisate (TPV) layer, a vinyl layer, or the like.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A method of manufacturing a load ramp for a vehicle, the method comprising the steps of:
    positioning a corrugated layer between a first layer, and a second layer such that the corrugated layer is in contact with a first interior surface of the first layer and a second interior surface of the second layer, wherein the corrugated layer defines a honeycomb structure, and wherein the honeycomb structure comprises a first sheet and a second sheet, wherein the first and second sheets are adjacent to one another and each comprise ridges and valleys;

applying a resin to a first exterior surface of the first layer while the first layer is in contact with the corrugated layer, wherein an amount of the resin applied is sufficient to permeate the first layer and contact the corrugated layer;

applying the resin to a second exterior surface of the second layer while the second layer is in contact with the corrugated layer, wherein an amount of the resin applied is sufficient to permeate the second layer and contact the corrugated layer;

curing the resin to form the load ramp for the vehicle; and coupling the load ramp to a closure panel of the vehicle.

2. The method of claim 1, wherein the step of curing the resin to form the load ramp for the vehicle comprises heating the first layer, the corrugated layer, and the second layer to a temperature in the range of about 150° C. to about 180° C.

3. The method of claim 2, wherein the temperature is in the range of about 150° C. to about 160° C.

4. The method of claim 1, wherein the step of curing the resin to form the load ramp for the vehicle comprises exposing the first layer, the corrugated layer, and the second layer to a pressure in the range of about 100 tons to about 400 tons.

5. The method of claim 4, wherein the pressure is in the range of about 250 tons to about 350 tons.

6. The method of claim 1, wherein a thickness of the first sheet and a thickness of the second sheet are each in the range of about 0.5 mm to about 2.0 mm.

7. The method of claim 1, wherein the ridges of the first sheet contact the valleys of the second sheet in an alternating fashion such that a series of cells are defined by the first sheet and the second sheet.

8. The method of claim 7, wherein a length of each cell in the series of cells is in the range of about 10 mm to about 20 mm.

9. The method of claim 8, wherein a width of each cell in the series of cells is in the range of about 5 mm to about 15 mm.

10. The method of claim 1, wherein a thickness of the corrugated layer is in the range of about 5 mm to about 15 mm.

11. The method of claim 1, wherein a thickness of the load ramp is in the range of about 10 mm to about 30 mm.

12. The method of claim 1, wherein a load capacity of the load ramp is at least about 100 kg.

13. The method of claim 1, wherein the corrugated layer is a processed cellulose fiber.

14. The method of claim 1, wherein the resin is polyurethane.

15. A method of manufacturing a load ramp for an automobile, the method comprising the steps of:

positioning a corrugated layer between a first layer and a second layer such that the corrugated layer is in direct contact with a first interior surface of the first layer and a second interior surface of the second layer, wherein the corrugated layer defines a honeycomb structure, and wherein the honeycomb structure comprises a first sheet and a second sheet, wherein the first and second sheets are adjacent to one another and each comprise ridges and valleys;

applying a resin to a first exterior surface of the first layer while the first layer is in contact with the corrugated layer, wherein an amount of the resin applied is sufficient to permeate the first layer and directly contact the corrugated layer;

applying the resin to a second exterior surface of the second layer while the second layer is in contact with the corrugated layer, wherein an amount of the resin applied is sufficient to permeate the second layer and directly contact the corrugated layer;

curing the resin to form the load ramp for the automobile; and coupling the load ramp to a closure panel of the vehicle.

16. The method of claim 15, wherein the step of positioning a corrugated layer between a first layer and a second layer such that the corrugated layer is in direct contact with a first interior surface of the first layer and a second interior surface of the second layer is executed prior to execution of the step of applying a resin to a first exterior surface of the first layer, wherein an amount of the resin applied is sufficient to permeate the first layer and directly contact the corrugated layer, and wherein the step of positioning a corrugated layer between a first layer and a second layer such that the corrugated layer is in direct contact with a first interior surface of the first layer and a second interior surface of the second layer is executed prior to execution of the step of applying the resin to a second exterior surface of the second layer, wherein an amount of the resin applied is sufficient to permeate the second layer and directly contact the corrugated layer.

17. The method of claim 15, wherein the step of curing the resin to form the load ramp for the automobile comprises exposing the first layer, the corrugated layer, and the second layer to a pressure in the range of about 300 tons to about 400 tons.

18. The method of claim 15, wherein the step of curing the resin to form the load ramp for the automobile comprises heating the first layer, the second layer, and the corrugated layer simultaneously.

* * * * *